United States Patent [19]
Paul

[11] 3,839,717
[45] Oct. 1, 1974

[54] COMMUNICATION APPARATUS FOR COMMUNICATING BETWEEN A FIRST AND A SECOND OBJECT

[75] Inventor: John C. Paul, Mt. View, Calif.

[73] Assignee: Identification Company, Inc., Oklahoma City, Okla.

[22] Filed: Jan. 28, 1972

[21] Appl. No.: 221,712

[52] U.S. Cl.......................... 343/6.5 LC, 343/6.5 SS
[51] Int. Cl............................................... G01s 9/56
[58] Field of Search ....... 343/6.5 R, 6.5 LC, 6.5 SS, 343/6.8 R, 6.8 LC

[56] References Cited
UNITED STATES PATENTS

| | | | |
|---|---|---|---|
| 3,197,769 | 7/1965 | Roth............................. | 343/6.5 LC |
| 3,341,845 | 9/1967 | Deman......................... | 343/6.5 LC |
| 3,685,050 | 8/1972 | Cartwright.................. | 343/6.8 R X |
| 3,701,150 | 10/1972 | Dame............................ | 343/6.5 SS |
| 3,714,650 | 1/1973 | Fuller et al................... | 343/6.5 LC |
| 3,754,250 | 8/1973 | Bruner.......................... | 343/6.5 LC |

Primary Examiner—T. H. Tubbesing
Attorney, Agent, or Firm—Dunlap, Laney, Hessin, Dougherty & Codding

[57] ABSTRACT

An improved communication apparatus for communicating between a first object and a second object wherein the first object includes apparatus for generating and transmitting a transmit signal and the second object includes apparatus for receiving the transmit signal and providing an emitted signal in response thereto, the emitted signal having a frequency coherently related to the frequency of the received transmit signal. The second object also includes an apparatus for encoding an identifying code having a unique code format wherein the beginning and the end of the code format are identifiable, the first object including apparatus for receiving the encoded emitted signal, identifying the code format encoded therein and determining the received emitted signal represents a valid code format. In one aspect, the first object apparatus receives encoded emitted signals via two receivers, identifies the code format encoded in the first-received and the second-received encoded emitted signals, determines that each received signal has a valid code format encoded therein and compares the code formats encoded in the first-received and the second-received emitted signal to determine the signals were emitted via the same second object. In one operational embodiment, the communication apparatus transmits a transmit signal and receives encoded emitted signals from a moving second object in response to the received transmit signal at a first position and a second position of the second object, the first and the second received encoded emitted signals being determined to represent a valid predetermined code format and it being determined that the received code formats are identical, the speed and direction of the moving object being determined in response to such valid determinations, the code format encoded in the received emitted signals being compared with predetermined identification code formats for locating predetermined second objects. The first object apparatus also generates and transmits a modulation signal, the second object apparatus including apparatus for detecting the modulation signal via a pulse width detector and providing an output indication in response thereto. In one particular operational embodiment, the first object apparatus is utilized to detect and monitor vehicle traffic, each vehicle (second object) having apparatus for receiving the transmit signal and providing the encoded emitted signal in response thereto, and for receiving the modulation signal and providing a driver-perceivable output indication in response thereto.

36 Claims, 16 Drawing Figures

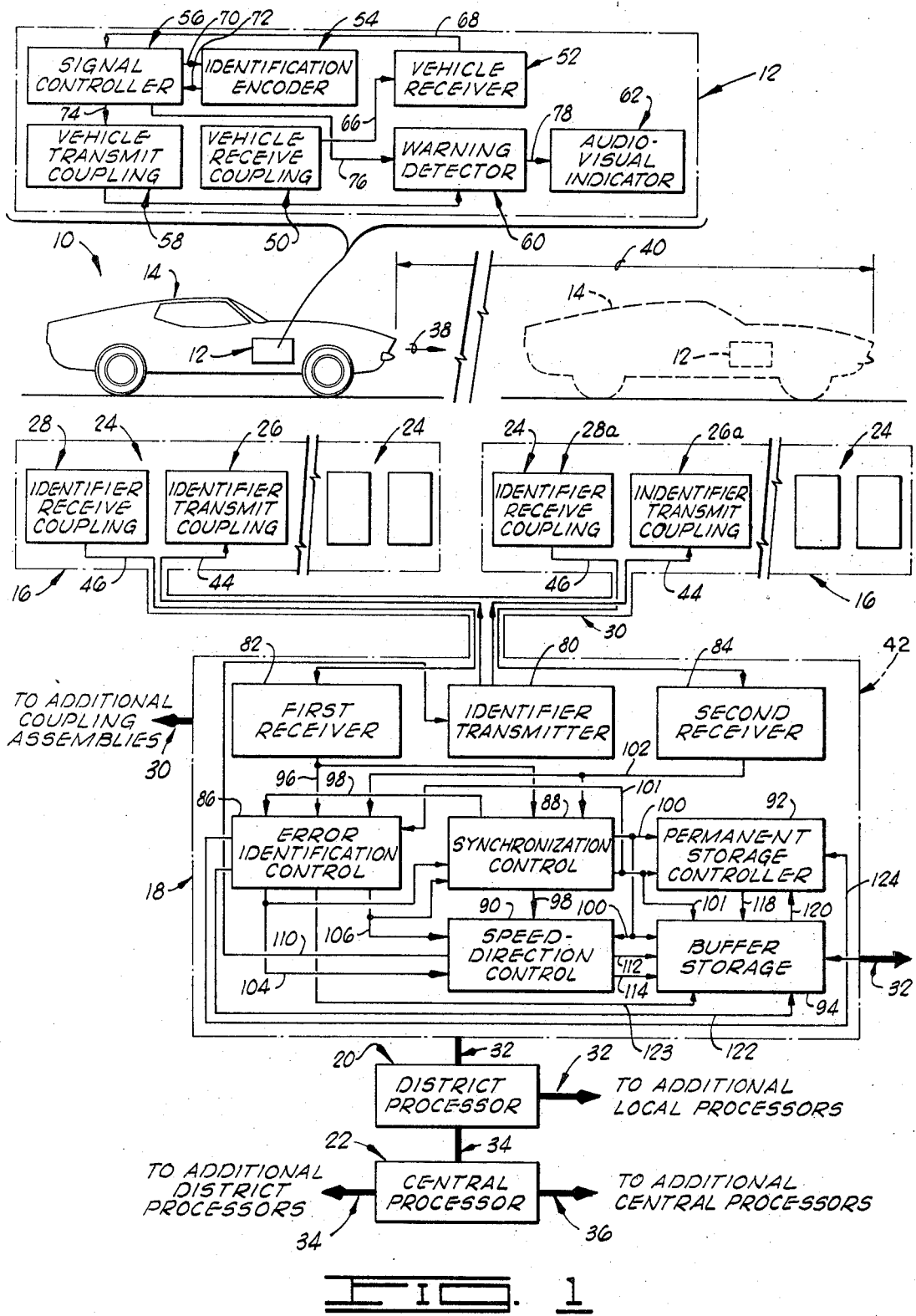

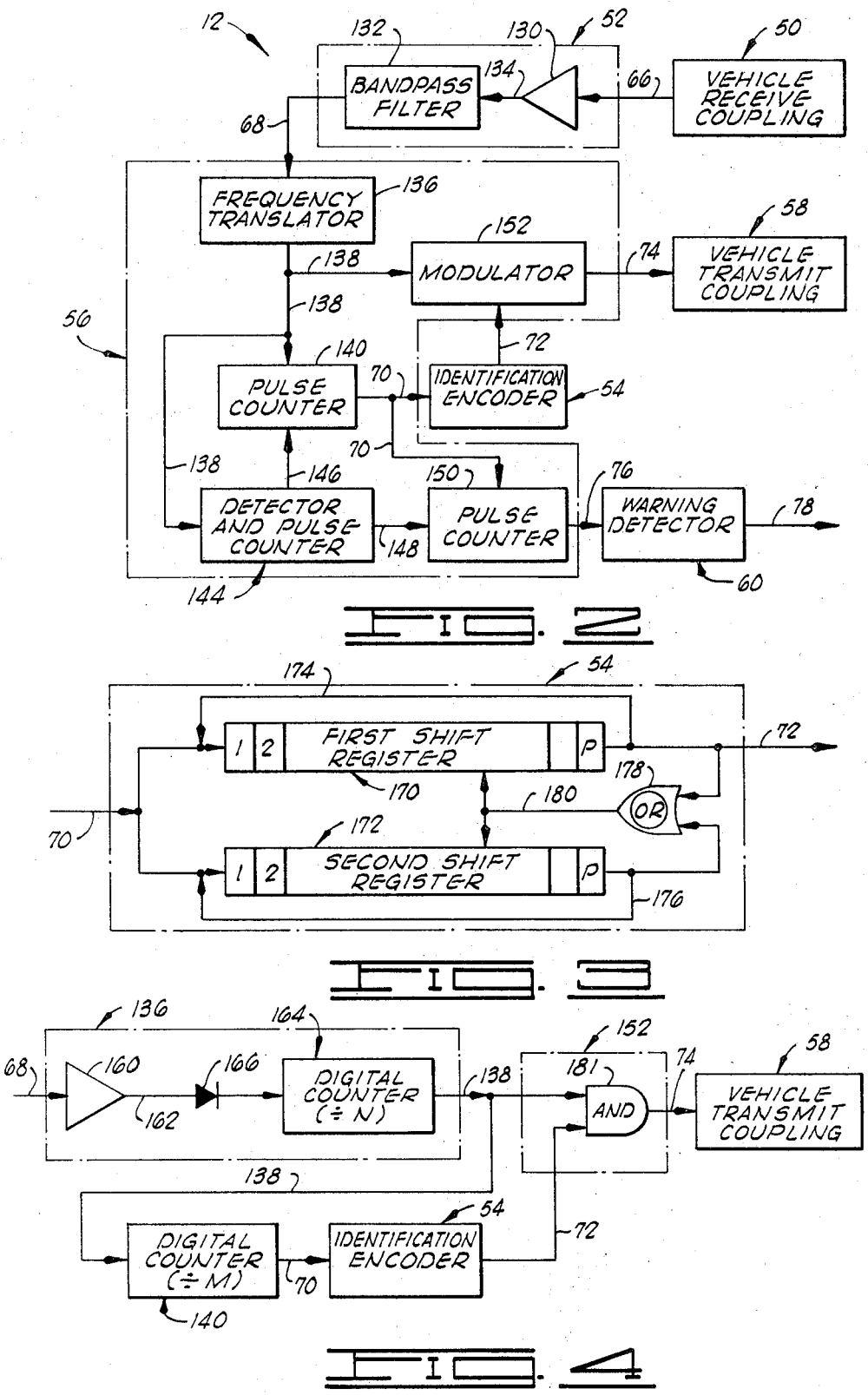

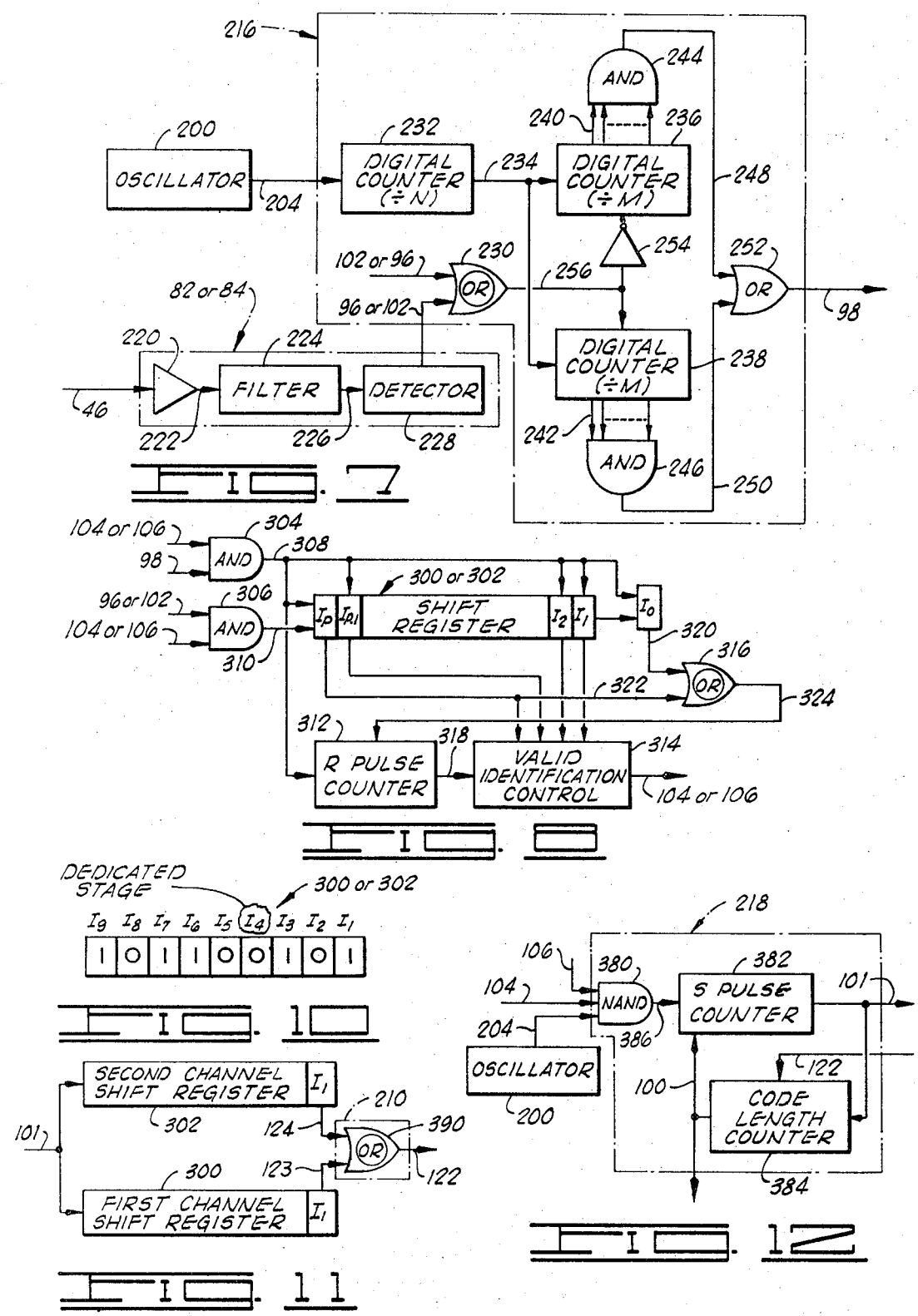

COMMUNICATION APPARATUS FOR COMMUNICATING BETWEEN A FIRST AND A SECOND OBJECT

BACKGROUND OF THE INVENTION

1. Field of the Invention

This invention relates generally to improvements in communication apparatus and, more particularly, but not by way of limitation, to communication apparatus for communicating between a first and a second object apparatus wherein the second object apparatus provides an emitted signal in response to a received transmit signal.

2. Brief Description of the Prior Art

In the past there have been many devices constructed to generate and transmit a signal, sometimes generally referred to as an interrogator and an interrogating signal, which is utilized to activate a second apparatus sometimes referred to generally as a responder, wherein the responder transmits a responder signal in response to the received interrogating signal. In some instances, such devices have been constructed to shape the responder signal in such a manner that the responder signal provides an indication of the responder identification. In many instances, the responder devices constructed in the past have been generally referred to as "passive," the term "passive" being generally utilized to designate a general type of transmitting apparatus which generates and transmits a signal in response to a particular, predetermined received signal.

There have also been interrogator-responder systems constructed in the past to interrogate responders located on various moving vehicles such as automobiles, trains and satellites, for example. One such system was disclosed in the U.S. Pat. No. 3,145,380, issued to Currie, wherein a passive responder was constructed to receive signals of different frequencies and transmit a coded signal in response to a particular interrogator signal. One other such device was disclosed in the U.S. Pat. No. 3,268,862, issued to Pettitt, wherein a roadside monitor transmitted distinct binary code data determined by the particular frequency of the transmitter of the roadside monitor, the vehicle responders being constructed to detect the discrete frequencies of the roadside monitor transmit signal to arrange the binary code data transmitted.

The U.S. Pat. No. 3,389,391, issued to Keller II, disclosed a vehicle identification system having a responder unit receiving an RF signal and transforming the received signal into a DC operating voltage for powering the responder transmitter which generated a series of pulses in a predetermined sequence, the binary code digits 0 and 1 being represented by two different tones and a third generated tone being utilized to indicate the beginning and the end of the binary-coded message. The U.S. Pat. No. 3,270,338, issued to Watters, disclosed an interrogator-responder system wherein the interrogator and the responder each included a pulse train generation means for developing a predetermined number of pulses spaced in time. These past systems, thus generally utilize the interrogating signal to develop an operating voltage for the responder transmitter or, in some instances, a plurality of signal frequencies are utilized to activate predetermined portions of the responder or interrogator, the various past systems generally including automatic gain control circuitry, elaborate signal synchronization circuitry or a plurality of tuning circuits responsive to designated frequencies.

SUMMARY OF THE INVENTION

An object of the invention is to provide an improved communication apparatus between two objects wherein an emitted signal is produced by one object in response to a received transmit signal from the other object.

Another object of the invention is to provide an improved apparatus for encoding predetermined codes on an emitted signal.

One other object of the invention is to provide an improved communication apparatus for identifyingly discriminating received signals.

A further object of the invention is to provide an improved code format having an identifiable beginning and ending in a more efficient and more economical manner.

An additional object of the invention is to provide an improved appatatus for substantially assuring that received encoded signals have predetermined code formats encoded therein in a more efficient and more economical manner.

Another object of the invention is to provide an improved apparatus for substantially assuring that encoded signals received by more than one receiver were originated by a single source.

One other object of the invention is to provide an improved synchronization control for a communication system wherein signals are transferred between two objects.

Yet another object of the invention is to provide an improved communication apparatus for monitoring vehicle traffic in a more efficient and more economical manner.

Still another object of the invention is to provide a communication apparatus for monitoring vehicle traffic having an improved vehicle location apparatus.

Another object of the invention is to provide an improved communication apparatus for detecting vehicle speed and direction and transmitting warning signals responsive thereto.

One other object of the invention is to provide a communication apparatus for receiving encoded signals and identifying the encoded data thereon in a substantially error-free manner.

An additional object of the invention is to provide an improved communication apparatus for communicating between two objects wherein the data encoded in an emitted signal is automatically synchronized with the apparatus receiving and decoding the encoded emitted signal in a more efficient and more economical manner.

Another object of the invention is to provide an improved apparatus for emitting a signal in response to a predetermined received signal which is economical and more efficient in construction and operation.

An additional object of the invention is to provide an improved communication apparatus which is more efficient and more economical in the construction and operation thereof.

Other objects and advantages of the invention will be evident from the following detailed description when read in conjunction with the drawings which illustrate various embodiments of the invention.

BRIEF DESCRIPTION OF THE DRAWINGS

FIG. 1 is a diagrammatical view particularly showing one operational embodiment of the communication apparatus of the invention.

FIG. 2 is a diagrammatical view showing the construction of the vehicle unit of the communication apparatus of FIG. 1 in greater detail.

FIG. 3 is a diagrammatical view of the identification encoder of the vehicle unit shown in FIGS. 1 and 2.

FIG. 4 is a diagrammatical view of a portion of the vehicle unit of FIGS. 1 and 2, showing the apparatus for providing the emitted signal, encoded with a predetermined identification code.

FIG. 7 is a diagrammatical view showing the input data clock and a typical receiver of the identifier unit of FIGS. 1 and 6.

FIG. 8 is a diagrammatical view showing a typical portion of the first and the second channel control of the identifier unit of FIGS. 1 and 6, for receiving the incoming encoded emitted signals and assuring the incoming data is substantially error-free.

FIG. 10 is a diagrammatical view of a typical digital shift register particularly showing a preferred identification code format.

FIG. 11 is a diagrammatical view of the first and the second channel shift registers and the channel comparator of the identifier unit of FIGS. 1 and 6.

FIG. 12 is a diagrammatical view showing the data transfer clock of the identifier unit of FIGS. 1 and 6.

DESCRIPTION OF THE PREFERRED EMBODIMENT

Figure 5:
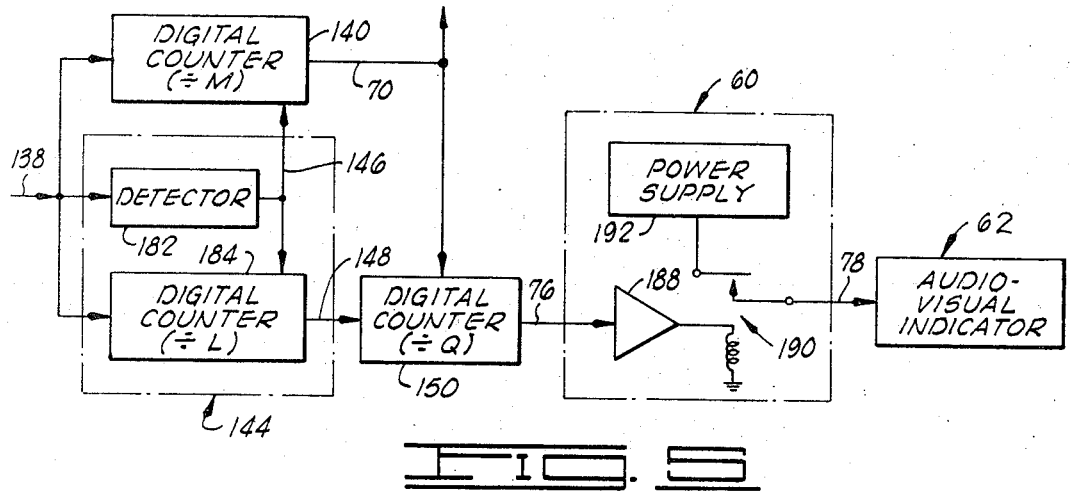
FIG. 5 is a diagrammatical view of a portion of the vehicle unit of FIGS. 1 and 2, showing the apparatus for detecting the received modulation or warning signal and providing the audio-visual output indication in response thereto.

Referring to the drawings in general, and to FIG. 1 in particular, diagrammatically shown therein and designated by the general reference numeral 10 is a communication apparatus which is generally constructed to provide communication between a first object and a second object wherein the first object includes apparatus generally constructed to generate and transmit an interrogating signal and the second object includes apparatus generally constructed to receive the interrogating signal and emit a signal in response thereto, the emitted signal being subsequently received and identified by the apparatus of the first object. The emitted signal from the apparatus of the second object is, more particularly, coherently related to the received interrogating signal or, in other words, for each predetermined set of cycles of the received interrogating signal, the second object emits a predetermined cycle or set of cycles. In one other aspect of the invention, the communication apparatus 10 is constructed such that the apparatus of the second object also includes an assembly for encoding a predetermined code in the emitted signal, and the first object also includes an assembly for decoding the received, encoded emitted signal, the predetermined code uniquely identifying the second object, for example. It should be particularly noted that the term "emitted" is utilized herein to distinguish the signal produced by the apparatus of the second object from a signal which is generated by a transmitted type of signal producing apparatus or the like, such as an oscillator, for example.

In another aspect of the communication apparatus of the present invention, the first object includes apparatus constructed for transmitting a signal or a plurality of signals, each signal being indicative of predetermined information or data to be communicated to the second object, and the second object includes apparatus for receiving and identifying the signal or signals indicative of the predetermined data and providing an output indication responsive thereto. In yet another aspect, the communication apparatus of the present invention is constructed such that the second object includes an assembly for encoding a predetermined code in the emitted signal such that the predetermined code is cyclicly repeated, and the first object includes an assembly for decoding the received, encoded signal and determining the received emitted encoded signal contains a predetermined code repeated therein for a predetermined number of times, the assembly of the first object providing an output indication in response to the determination that the received, emitted encoded signal contains a predetermined code repeatable for a predetermined number of times. The predetermined cyclicly repeated code is, in one form, constructed or designed such that the code format thereof includes an intervening dedicated stage to facilitate a determination of the beginning and the ending of a code word.

In another aspect, the communication apparatus is constructed such that the first object includes a data processing assembly constructed to receive data at spaced intervals of time from an assembly of the second object, to determine if each incoming data signal is of a nature produced by the assembly of the second object, and to compare the first-received data and the second-received data, a portion of the assembly of the first object providing an output indication in response to a predetermined comparison of the first-received data and the second-received data.

The various aspects of the invention, generally mentioned above, are particularly shown in the drawings and described below with respect to one particular operational embodiment for the purpose of clarity of description. More particularly, the communication apparatus 10 shown in the drawings and described below refers to a vehicle identification and warning apparatus (the communication apparatus 10 being sometimes referred to below as the vehicle identification and warning apparatus 10) which is particularly constructed to monitor and control vehicle traffic along predetermined, designated roadways or highways or the like. The vehicle identification and warning apparatus 10 is constructed to provide a more efficient, more economical and faster means for communicating between moving vehicles and stationary roadside monitors and various processors, and is constructed to provide an efficient, more economical, and substantially error-free apparatus for processing received data.

With respect to the vehicle identification and warning apparatus 10, the first object, generally referred to above, more particularly refers to the roadside monitors and the various processors, and the second object, generally referred to above, more particularly refers to the moving vehicle having a vehicle unit securedly located therein. Further, in this regard, the interrogating signal generated and transmitted by the first object, generally mentioned before, more particularly refers to the "transmit signal." Thus, in general, the various terms utilized below to describe the various components, assemblies and operational aspects of the present invention, will more particularly refer to the vehicle identification and warning apparatus 10 for the purpose of clarity of description, it being specifically understood that the various aspects of the present invention are not limited to this particular operational embodiment thereof.

Referring more particularly to the operational embodiment of the invention, as diagrammatically shown in FIG. 1, the vehicle identification and warning apparatus 10 generally includes: a plurality of vehicle units 12, each vehicle unit 12 being disposed in one particular, predetermined, known vehicle 14; a plurality of coupling assemblies 16, the coupling assemblies 16 being spaced along predetermined, designated portions of roadways or highways or the like; a plurality of roadside monitors 18; a plurality of district processors 20; and a plurality of central processors 22. For the purpose of clarity of description and by way of example, only one vehicle 14 having a vehicle unit 12 secured therein is shown in FIG. 1 (the vehicle 14 and the vehicle unit 12 being shown in a first position in solid-lines and shown in a second position in dashed-lines); only one vehicle unit 12 is diagrammatically shown in FIG. 1, that being the vehicle unit 12 secured in the vehicle 14; only two coupling assemblies 16 are shown in FIG. 1, a portion of one of the coupling assemblies 16 being in communicating proximity with the vehicle unit 12 when the vehicle 14 is in the first position, and a portion of the other coupling assembly 16 being in communicating proximity with the vehicle unit 12 located in the vehicle 14 in the second position of the vehicle 14; and only one roadside monitor 18, one district processor 20 and one central processor 22 are shown in FIG. 1.

The coupling assemblies 16 each include one or more identifier couplings 24, each identifier coupling 24 being constructed and disposed with respect to a particular, predetermined path or lane of vehicle traffic to monitor the vehicle traffic moving along that particular, designated lane or path. In other words, each identifier coupling 24 is disposed with respect to a designated path or lane of vehicle traffic such that the identifier coupling 24 is in communicating proximity with the vehicle units 12 located within the vehicles 14 travelling along that particular, designated portion of a lane or path of vehicle traffic.

Each identifier coupling 24 generally includes, an identifier transmit coupling 26 and an identifier receive coupling 28, one identifier transmit coupling 26 and one identifier receive coupling 28 being disposed to monitor each designated, lane of vehicle traffic assigned to one particular roadside monitor 18, in a preferred form. Only one of the identifier couplings 24 of each of the coupling assemblies 16 has been diagrammatically shown in detail in FIG. 1, and it is to be specifically understood that the coupling assemblies 16 each include a predetermined number of identifier transmit couplings and identifier receive couplings for monitoring various, designated portions of vehicle traffic, in a manner similar to that described with respect to the particular identifier couplings 24.

It shoudl also be noted that the identifier receive coupling and the identifier transmit coupling of one of the coupling assemblies 16, shown in FIG. 1, have been designated by the reference numerals 26a and 28a, respectively, for the purpose of clarity of description and identification, the identifier transmit coupling 26 and the identifier receive coupling 28 being disposed in communicating proximity with the vehicle unit 12 of the vehicle 14 in the first position of the vehicle 14, and the identifier transmit coupling 26a and the identifier receive coupling 28a being disposed in communicating proximity with the vehicle unit 12 located in the vehicle 14 in the second position of the vehicle 14. The identifier transmit couplings and the identifier receive couplings of each identifier coupling 24 are each constructed to cooperate with a vehicle transmit coupling and a vehicle receive coupling such that electrical signals can be transferred therebetween, and the identifier transmit couplings, the identifier receive couplings, the vehicle transmit couplings and the vehicle receive couplings can each be of the type generally referred to in the art as a magnetic, electrical, acoustic, electromagnetic radiation, electrical conductor transmission means or other such apparatus constructed to transfer or couple electrical signals.

Each coupling assembly 16 is connected to a portion of one of the roadside monitors 18 via a communicating link 30; each roadside monitor 18 is connected to one of the district processors 20 via a communicating link 32; each district processor 20 is connected to one of the central processors via a communicating link 34; and each of the central processors 22 are interconnected via communicating links 36, as diagrammatically indicated in FIG. 1. The communicating links 32, 34 and 36 are each constructed such that data or information in the form of electrical signals or the like can be transferred between the roadside monitors 18 and the district processors 20, and such that information or data in the form of electrical signals or the like can be transferred between the various processors 20 and 22. In one embodiment of the invention, each communicating link 32, 34 and 36 consists of a "data link" of a commercial telephone transmission line, such as a coaxial line or other such transmission line or the like, for example, the primary design consideration being simply the fast, efficient and economical transmission of information or data between various units and assemblies.

As birefly mentioned before, the various aspects of the present invention will be more particularly described herein with respect to the vehicle identification and warning apparatus 10. More particularly, various aspects of the vehicle identification and warning apparatus 10 will be described herein with respect to the vehicle 14 travelling in a general direction 38 a known distance 40 from the first position to the second position thereof.

Each roadside monitor 18 includes one or more identifier units, designated by the general reference numeral 42 in FIG. 1, each identifier unit 42 being in communication with at least two identifier coupling 24 which are disposed and positioned in predetermined, known positions along a particular, designated, monitored lane or roadway and which are speced a known, predetermined distance apart. It should be noted that, in a practical application, it is not considered necessary to duplicate each component and assembly of the identifier unit 42, to be described in detail below, but rather some of the components and assemblies will be common to each identifier unit system, as will be apparent to those skilled in the art from the detailed description herein.

The identifier unit 42 is constructed to generate and transmit a signal which is transferred to the identifier couplings 24 in communication therewith via a transmit signal path, the transmit signal path between the identifier transmit coupling 26 and the identifier unit 42 and between the identifier transmit coupling 26a and the identifier unit 42 each being designated by the general reference numeral 44 in FIG. 1. The identifier unit 42 is also constructed to receive signals from the identifier receive couplings in communication therewith via a receive signal path, the receive signal path between the identifier receive coupling 28 and the identifier unit 42 and between the identifier receive coupling 28a and the identifier unit 42 each being designated in FIG. 1 by the general reference numeral 46.

The signal generated by the identifier unit 42 and transmitted along the transmit signal path 44 is, in a preferred form, a single frequency electrical signal, and is sometimes referred to and designated herein as the "transmit signal ($S_T$)," for the purpose of reference and signal identification. The signal received by the identifier unit 42 which is transmitted along the receive signal path 46 is emitted from a portion of the vehicle unit 12, and is, in a preferred form, an electrical signal which is coherently related to the transmit signal ($S_T$), this signal being sometimes referred to and designated herein as the "emitted signal ($ES_T$)," for the purpose of reference and signal identification.

It should be particularly noted that the emitted signal ($ES_T$) from the vehicle unit 12 is not, in a preferred form, generated by a separate signal generating apparatus such as a transmitted or oscillator or other signal generating apparatus or the like. In this manner, the vehicle unit 12 can be constructed in such a manner that the design requirement of automatic gain control apparatus or the like, is eliminated and the vehicle unit 12 automatically maintains frequency synchronization with the signal frequencies generated and transmitted by the identifier units 42, in a manner to be described in greater detail below.

Each vehicle unit 12 is constructed to receive the transmit signal ($S_T$) and to produce in response thereto the emitted signal ($ES_T$) encoded with a vehicle identification code uniquely identifying the particular vehicle, each vehicle unit 12 generally including: a vehicle receive coupling 50, a vehicle receiver 52, an identification encoder 54, a signal controller 56 and a vehicle transmit coupling 58, as diagrammatically shown in FIG. 1. The vehicle receive coupling 50 and the vehicle transmit coupling 58 are each constructed similar to the identifier transmit couplings 26 and the identifier receive couplings 28 such that electrical signals can be transferred therebetween and, more particularly, such that the transmit signal ($S_T$) is transferred from the identifier unit 42 to the vehicle unit 12 via the identifier transmit coupling 26 and the vehicle receive coupling 50 and the emitted signal ($ES_T$) is transferred from the vehicle unit 12 to the identifier unit 42 via the vehicle transmit coupling 58 and the identifier receive coupling 28.

The vehicle receiver 52 is constructed to receive a signal 66 from the vehicle receive coupling 50 and to provide an output signal 68, the vehicle receiver input signal 66 and the vehicle receiver output signal 68 basically corresponding to the transmit signal ($S_T$) generated via the identifier unit 42. The vehicle unit 12 and, more particularly, the vehicle receiver 52 is also constructed such that the identification encoder 54 and the signal controller 56 are each activated when the signal energy of the received, transmit signal ($S_T$) exceeds a predetermined threshold level, the threshold level being determined to be of a sufficient level to activate predetermined portions of the identifier unit 42, in a manner and for reasons to be made more apparent below.

It should be noted that the term "communicating proximity" is utilized herein to designate a predetermined spacial relationship between the vehicle couplings 50 and 58 and the identifier couplings 26 and 28 wherein a signal can be transferred therebetween, the precise distance in any one particular application being controlled by such design factors as, for example, the particular type of coupling construction utilized, as well known in the art.

The signal controller 56 is constructed to receive the vehicle receiver output signal 68 and to provide an output signal 70 in response thereto, the signal controller output signal 70 being connected to and received by the identification encoder 54. The identification encoder 54 is constructed to store a predetermined, identifiable vehicle identification code, each vehicle identification code being unique to one, predetermined, designated vehicle. The vehicle identification codes may be any particular code or designation which uniquely identifies each vehicle, the vehicle identification codes being, in a preferred form, or a substantially unchanging nature (that is the vehicle identification code is preferably of a nature such that the vehicle identification code remains constant and uniquely identifies one particular vehicle over a relatively large period of time) such as the vehicle registration number or motor number or the like, for example.

The identification encoder 54 receives the signal controller output signal 70 and provides an output signal 72 in response thereto, the identification encoder output signal 72 being indicative of the vehicle identification code permanently stored or retained in a portion of the identification encoder 54 of the vehicle unit 12. The signal controller 56 receives the identification encoder output signal 72 and provides an output signal 74 which, more particularly, corresponds to the encoded emitted signal ($ES_T$), mentioned before. In a preferred form, the signal controller 56 is constructed to utilize the identification encoder output signal 72 in the nature of a modulation signal for modulating a frequency translated signal produced from the incoming vehicle receiver output signal 68 such that the signal controller output signal 74, corresponding to the emitted signal ($ES_T$), not only contains the vehicle identification code, but also such that the emitted signal ($ES_T$) is coherently related to the transmit signal ($S_T$), in a manner generally described above and which will be described in greater detail below.

The signal controller output signal 74 is connected to and received by the vehicle transmit coupling 58, the emitted signal ($ES_T$) produced via the signal controller 56 being coupled to the identifier unit 42 via the vehicle transmit coupling 58 and the identifier receive coupling 28 in communicating proximity therewith. The received, encoded emitted signal ($ES_T$) is connected to the identifier unit 42 via the communicating link 30 between the coupling assembly 16 and the roadside monitor 18 and, more particularly, via the receive signal path 46 between the identifier receive coupling 28 and the identifier unit 42. The received, emitted signal ($ES_T$) is thus emitted from the vehicle unit 12 and received by the identifier unit 42, the encoded emitted signal ($ES_T$) being coherently related to the transmit signal ($S_T$) and the various components and assemblies of the identifier unit 42 being constructed to receive and process the incoming, encoded emitted signal ($ES_T$), in a manner and for reasons which will be described in greater detail below.

The roadside monitor 18 and, more particularly, the identifier unit 42 portion of the roadside monitor 18, in a preferred form, is also constructed to generate and transmit a unique signal for communicating with a portion of the vehicle unit 12 and, more particularly, for activating selected, predetermined portions of the audio-visual indicator 62 of the vehicle unit 12. The unique, generated and transmitted signal for activating selected portions of the audio-visual indicator 62 of the vehicle unit 12 is sometimes referred to herein and designated as the "warning signal ($WS_T$)" for the purpose of signal ientification and clarity of description. The warning signal ($WS_T$) is transferred to the vehicle unit 12 via the identifier transmit coupling 26 and the vehicle receive coupling 50, in a manner similar to that described before with respect to the transmit signal ($S_T$).

The warning signal ($WS_T$) is received by the vehicle receiver 52 via the vehicle receive coupling 50, the warning signal ($WS_T$) being connected to the path 68. The signal controller 56 is constructed to receive the warning signal ($WS_T$) from the vehicle receiver 52, to identify the warning signal ($WS_T$) and to produce a signal 76 in response to the identified, received warning signal ($WS_T$). The signal controller output signal 76 is connected to and received by the warning detector 60, the warning detector 60 being constructed to provide an output signal 78 in response to the received warning signal ($WS_T$).

The warning detector output signal 78 is connected to and received by a portion of the audio-visual indicator 62 of the vehicle unit 12 which is, more particularly, constructed to provide a driver-perceivable type of indication indicative of a predetermined condition or status controlled by the warning signal ($WS_T$) generated and transmitted by the identifier unit 42. For example, when the vehicle unit 14 has been identified and the roadside monitor 18 has determined that the vehicle 14 is travelling at the rate of speed in excess of the predetermined, known speed limit for that particular monitored portion of the highway or the like, the audio-visual indicator 62 is activated to provide an indication to inform the driver that the vehicle rate of speed exceeds the speed limit, that the excessive speed has been detected, and that a citation or the like has been issued for the particular violation. The particular output indication provided by the audio-visual indicator 62 can consist of lighting an indicator lamp on a display panel (not shown) located in the vehicle 14 or, in one other form, the output indication provided by the audio-visual indicator 62 can be in the nature of an audible tone of a predetermined frequency or the like, the particular type of indication and the various components and connections to provide such an indication in response to a particular, received warning signal ($WS_T$) will be apparent to those skilled in the art in view of the detailed description of the vehicle identification and warning apparatus 10 contained herein.

It should also be particularly noted that the warning signal ($WS_T$), the warning detector 60 and the audio-visual indicator 62 can be constructed to provide a plurality of driver-perceivable indications indicative of various roadway conditions such as, for example, ice, school zones, railroad crossings, travelling in the wrong direction or other such indications, in one form of the invention. In one other form, the warning signal ($WS_T$) can be utilized in cooperation with the warning detector 60 and the audio-visual indicator 62 to provide a driver-perceivable indication informing the driver to communicate with a predetermined agency or the like for receiving a particular message, for example. The warning signal ($WS_T$) and the cooperating apparatus of the vehicle unit 12 and the identifier unit 42 thus provide the basic apparatus for communicating with the driver of the vehicle from a stationary location via the vehicle unit 12, such communication being useful for numerous purposes, as will be made more apparent below.

The roadside monitor 18 and, more particularly, the identifier unit 42 generates the transmit signal ($S_T$) and the warning signal ($WS_T$) and is constructed to receive and process the encoded emitted signal ($ES_T$), as generally mentioned before. The identifier unit 42 generally includes: an identifier transmitter 80 constructed to generate and transmit the transmit signal ($S_T$), in one position thereof, and to generate and transmit the warning signal ($WS_T$), in one other position thereof; a first receiver 82; a second receiver 84; an error identification control 86; a synchronization control 88; a speed-direction control 90; a permanent storage controller 92; and a buffer storage 94.

The first-received emitted signal ($ES_T$) is connected to and received by the first receiver 82 of the identifier unit 42 via the receive signal path 46 between the coupling assembly 16 and the roadside monitor 18. The first receiver 82 receives the incoming, first-received emitted signal ($ES_T$) and is constructed to produce an output signal 96 in response thereto, the first receiver output signal 96 being connected to and received by a portion of the error identification control 86 and the synchronization control 88 of the identifier unit 42, as diagrammatically illustrated in FIG. 1.

A portion of the synchronization control 88 is constructed to receive the first receiver output signal 96 from the first channel receiver and to generate an input clock pulse 98, which is engaged to and received by a portion of the error identification control 86 for scheduling the operation of a portion thereof receiving the incoming data via the first receiver output signal 96. A portion of the synchronization control 88 is also constructed to produce a transfer clock reset pulse 100 for reactivating the identifier unit 42 for receiving incoming data via subsequently received emitted signals ($ES_T$), the transfer clock reset pulse 100 being connected to the permanent storage controller 92, the speed-direction control 90 and the buffer storage 94. The synchronization control 88 also provides a transfer clock pulse 101 in response to a determination that a valid vehicle identification code has been clocked into the error identification control 86 via a first-received and a second-received emitted signal, the transfer data clock pulse 101 being connected to the error identification control 86, the permanent storage controller 92 and the buffer storage 94, for reasons to be described in greater detail below.

The input clock pulse 98 produced via an input data clock generally consists of a continuous chain of timing or clock pulses for synchronizingly controlling the operation of the various components and assemblies of the identifier unit 42 which are positioned to receive the incoming, emitted signals ($ES_T$), thereby providing a synchronization control between the vehicle unit 12 and the identifier unit 42 for transferring data from the vehicle unit 12 to the identifier unit 42 at a predetermined controlled rate. The transfer clock pulse 101 also basically comprises a continuous chain of timing or clock pulses for synchronizingly controlling the transfer of data between the various components and assemblies of the identifier unit 42, the generation and the utilization of the input clock pulse 98 and the transfer clock pulse 101 to be described in greater detail below.

The second-received emitted signal ($ES_T$) is connected to and received by the second receiver 84 via the receive signal path 46 and the communicating link 30 between the coupling assembly 16 and the roadside monitor 18, in a manner similar to that described before with respect to the incoming first-received emitted signal ($ES_T$) and the first receiver 82, the second receiver 84 providing an output signal 102 in response thereto. The second receiver output signal 102 is connected to and received by a portion of the error identification control 86 and a portion of the synchronization control 88. The synchronization control 88 is constructed to receive the second receiver output signal 102 and to generate the input clock pulse 98, the transfer clock reset pulse 100 and the transfer clock pulse 101 in a manner and for reasons similar to that described before with respect to the incoming, emitted signal ($ES_T$) received by the first receiver 82.

The error identification control 86 is constructed to determine whether the incoming data on the first-received emitted signal ($ES_T$) from the first receiver 82 represents a valid vehicle identification code, the error identification control 86 providing a first channel valid data signal 104 in response to a valid-determination (a determination that the first-received emitted signal ($ES_T$) represents a valid vehicle identification code). The first channel valid data signal 104 is connected to and received by a portion of the speed-direction control 90, the speed-direction control 90 being activated in response to the received first channel valid data signal 104.

The error identification control 86 is also constructed to determine that the incoming data on the second-received emitted signal ($ES_T$) represents a valid vehicle identification code, the error identification control 86 producing a second channel valid data signal 106 in response to a valid-determination (a determination that the second-received emitted signal ($ES_T$) represents a valid vehicle identification code). The second channel valid signal 106 is connected to and received by a portion of the speed-direction control 90, the speed-direction control 90 being deactivated and held in a deactivated status in response to the received second channel valid data signal 106. In this deactivated-hold position of the speed-direction control 90, the various excess speed and directions determinations are temporarily held therein until the vehicle identification code on the first-received emitted signal has been compared with the second-emitted signal, in a manner to be described in greater detail below.

As shown in FIG. 1, the first and the second channel valid data signals 104 and 106 are each also connected to a portion of the synchronization control 88, the synchronization control 88 being constructed to receive the first and the second channel valid data signals 104 and 106 and to disengage the input clock pulse 98 and to produce the transfer clock pulse 100 in response to the received signals 104 and 106 indicating that a valid vehicle identification code has been received by the error identification control 86 from the first receiver 82 and the second receiver 84. In the activated position of the transfer clock pulse 101, the error identification control 86 compared the first-received and the second-received vehicle identification codes, in a manner to be described in greater detail below.

In one position, the speed-direction control 90 is constructed to provide an output signal 110 in response to a determination that the first-received and the second-received emitted signals ($ES_T$) have been compared and that the compared emitted signals ($ES_T$) were emitted from the identical vehicle unit 12, the output signal 110 being sometimes referred to below as the "warning actuator signal" 110 for the purpose of clarity of description and signal identification. A portion of the identifier transmitter 80 is constructed to receive the warning actuator signal 110 and to generate and transmit the warning signal ($WS_T$), mentioned before, in response thereto. The transmitter warning signal ($WS_T$) is transferred or coupled to the vehicle unit 12 via the identifier coupling 24, in a manner similar to that described before with respect to the transmit signal ($S_T$).

A portion of the speed-direction control 90 is also connected to the buffer storage 94 via signal paths 112 and 114 in such a manner that the vehicle speed and direction determinations can be transferred to the buffer storage 94. In the operational embodiment of the invention shown in the drawings, the speed determinations are, more particularly, transferred to the buffer storage 94 via the signal path 112 and the direction determinations are, more particularly, transferred to the buffer storage 94 via the signal path 114, the signal paths 112 and 114 being sometimes referred to below as "speed signal" 112 and the "direction signal" 114 for the purpose of clarity of description and signal identification.

A portion of the permanent storage controller 92 is constructed to receive vehicle identification codes from the error identification control 82, to compare the received vehicle identification codes with vehicle identification codes stored therein, and to provide a permanent storage comparison signal 118, which is connected to and received by a portion of the buffer storage 94, in response to a determination that the vehicle identification codes received via the first and the second receivers 82 and 84 compare identically with one of the vehicle identification codes stored therein. The permanent storage comparison signal 118 is utilized by the identifier unit 42 to provide a signal identification to the buffer storage 94 indicative of the comparison determination, generally described above, for reasons which will be made more apparent below.

A portion of the permanent storage controller 92 and the buffer storage 94 are each constructed such that data can be transferred therebetween via the signal path 120. A portion of the permanent storage controller 92 is utilized for storing data or information is electrostatic, ferroelectric, magnetic, acoustic, optical, chemical, electronic, electrical, mechanical or other such form storage, for example, to provide a location within the identifier unit 42 into which data can be entered, retained, and retrieved at predetermined times. The buffer storage 94, more particularly, is, in a preferred form, of the type of storage element generally referred to in the art as a synchronized storage element constructed to provide a temporary storage for various data allowing various data transferring processes to be continued via the identifier unit 42. Permanent storage elements and buffer storage elements are well known in the art.

Thus, the various vehicle identification codes retained in permanent storage controller 92 can be transferred thereto through the buffer storage 94 via the communicating link 32 connecting the identifier unit 42 with the district processor 20. In one other form, the vehicle identification codes may, for example, originate from a particular central processor 22 and be stored in the permanent storage 92 of a particular identifier unit 42 in such a manner that the data is first transferred to one of the district processors 20 and subsequently transferred to the particular, designated identifier unit 42 via the communicating links 32 and 34, the communicating links 32 and 34 providing the basic network for communicating between the roadside monitors 18 and the district and central processors 20 and 22 as may be required in a particular application. The vehicle identification codes which are stored in the permanent storage controller 92 can be, for example, indicative of predetermined classes of vehicles such as patrol cars or the like whose location at any time can be automatically updated, or, in one other form, for example, the vehicle identification codes may designate a particular vehicle which is required to be located for some designated purpose.

As generally mentioned before, the error identification control 86 determines that the vehicle identification codes received by the first and the second receivers 82 and 84 are identical and, more particularly, provides a channel data comparison signal 122 in response to such a determination. The channel data comparison signal 122 is connected to and received by a portion of the buffer storage 94, as generally mentioned before. The compared, designated vehicle identification code is transferred to the buffer storage 94 via a signal 123 from the error identification control 86 and is transferred to a portion of the permanent storage controller 92 for comparison with the vehicle identification codes stored therein, as mentioned before, via the signal 124, in a manner to be described in greater detail below.

In any event, the valid-compared vehicle identification code and the speed and direction determinations are each transferred to the buffer storage 94, and this data can then be transferred to the district precessors 20 and to the central processors 22 upon a command signal therefrom via the communicating links 32 and 34 therebetween. In one operational embodiment, the central processor 22, for example, is constructed to automatically identify the name and address of the vehicle owner corresponding to the vehicle identification code and issue the warning or citation via standard computer techniques wherein the warning or citation is printed via a conventional computer print-out. The district processors 20 and the central processors 22 each consist of conventional computer type memory and processing various data in cooperation with the various roadside monitors.

Operation of FIG. 1

The vehicle identification and warning apparatus 10, as described before, is constructed to monitor and control vehicle traffic along particular, designated portions of highways or the like in a fast, efficient and substantially error-free manner. Utilizing the operational example diagrammatically shown in FIG. 1, when the vehicle 14 moving in the direction 38 initially moves to the first position (shown in solid-lines) wherein the vehicle unit 12 therein is in communicating proximity with the identifier transmit coupling 26, the transmitted signal ($S_T$) generated via the identifier transmitter 80 is coupled to the vehicle unit 12 via the identifier transmit coupling 26 and the vehicle received coupling 50. The receive, transmit signal ($S_T$) is then transferred via the vehicle receiver 52 through the signal controller 56 via the signal path 68 therebetween, the received transmit signal ($S_T$) being subsequently transferred to the identification encoder 54 via the signal path 70 therebetween. The identification encoder 54 encodes the vehicle identification code in the transmit signal ($S_T$) and subsequently transfers the encoded signal through the signal controller 56 to the vehicle transmit coupling 58 via the signal paths 72 and 74, respectively.

In a preferred form, the identification encoder 54 and signal controller 56 of the vehicle unit 12 are activated via the vehicle receiver output signal 68 when the signal energy of the received transmit signal ($S_T$) exceeds a predetermined threshold. More particularly, the vehicle receiver 52 is designed to have a predetermined threshold (the term threshold being utilized herein to designate a predetermined, minimum signal strength at which the vehicle receiver 52 provides a cognizable output signal 68 for activating the identification encoder 54 and the signal controller 56 of the vehicle unit 12) such that the signal controller 56 and the identification encoder 54 are activated only when the signal strength of the received transmit signal ($S_T$) is of a sufficient strength that an emitted signal ($ES_T$) from the vehicle unit 12 has a sufficient signal strength to activate the error identification control 86 of the identifier unit 42. In this manner, the design requirement of automatic gain control circuitry to compensate for variations in the received signal strengths resulting from changes in the vehicle 14 position during the period of time when the vehicle unit 12 is in communicating proximity with the identifier coupling 24 is eliminated.

Thus, each roadside monitor 18 and each vehicle unit 12 are constructed to automatically compensate for the marginal signal-to-noise region when the vehicle 14 is approaching or moving away from a particular identifier coupling 24, while providing an improved system reliability wherein the cost of manufacturing the vehicle units 12 is substantially reduced.

The emitted signal ($ES_T$) from the vehicle unit 12 is coupled to the first receiver 82 via the vehicle transmit coupling 58, the identifier receive coupling 28 and the communicating link 30 between the coupling assembly 16 and the roadside monitor 18. The first receiver 82 detects the first-received emitted signal ($ES_T$) and produces a time series of pulses indicative of the vehicle identification code of the vehicle unit 12 via the signal 96, the first-received emitted signal ($ES_T$) being connected to and activating the error identification control 86 and the synchronization control 88. The activated synchronization control 88 provides the input clock pulse 98, the input clock pulse 98 being automatically synchronized with incoming data via the first-received emitted signal ($ES_T$). When the error identification control 86 determines that the incoming data via the first-received emitted signal ($ES_T$) represents a valid vehicle identification code, the first channel valid data signal 104 is produced and operates to disengage a first channel shift register portion of the error identification control 86 from the input clock pulse 98 and the incoming data via the first receiver 82, the first channel valid data signal 104 also being connected to and activating the speed-direction control 90.

The vehicle 14 subsequently moves a distance 40 and into communicating proximity with the identifier transmit coupling 26a and the identifier receive coupling 28a. In this position of the vehicle 14 (the second position), the transmit signal ($S_T$) is coupled to the vehicle unit 12 via the identifier transmit coupling 26a and the vehicle receive coupling 50. The second-received transmit signal ($S_T$) is transferred by the vehicle receiver 52 to the signal controller 56, encoded with the vehicle identification number via the identification encoder 54 and transferred to the vehicle transmit coupling 58, in a manner similar to that described before with respect to the first-received transmit signal ($S_T$), the vehicle unit 12 providing the encoded emitted signal ($ES_T$) in response to the second-received transmit signal ($S_T$).

The second emitted signal ($ES_T$) is transferred to the identifier unit 42 via the vehicle transmit coupling 58 and the identifier receive coupling 28a in a manner similar to that described before with respect to the first emitted signal ($ES_T$). The second emitted signal ($ES_T$) is received by the second receiver 84 via the signal path 46 between the identifier receive coupling 28a and the second receiver 84. The second receiver 84 detects the second-received emitted signal ($ES_T$) and produces a time series of pulses indicative of the vehicle identification code of the vehicle unit 12 via the signal 102, the second-received emitted signal ($ES_T$) activating the error identification control 86 and the synchronization control 88, the synchronization control 88 providing the input clock pulse 98, in a manner similar to that described before with respect to the first received emitted signal ($ES_T$).

The error identification control 86 initially determines that the second-received emitted signal ($ES_T$) represents or has encoded therein a valid vehicle identification code and produces the second channel valid data signal 106 in response to such a determination, the second channel valid data signal 106 deactivating and positioning the speed-direction control 90 in the deactivated hold position thereof. The error identification control 86 then compares the vehicle identification code received via the first receiver 82 with the vehicle identification code received via the second channel receiver 84 to determine that the first-received incoming signal and the second-received incoming signals were each emitted from an identical vehicle unit 12, the error identification control 86 providing the channel data comparison signal 122 in response to an identical comparison of the two received signals.

The speed-direction control 90 determines the speed and direction of the identified vehicle 14, in one form, and the speed and direction determinations thereof are retained therein until the speed-direction control 90 is activated by the channel data comparison signal 122. Upon being activated in response to the channel data comparison signal 122, the speed-direction control 90 produces the warning actuation signal 110, if an excess speed or a wrong direction of travel has been determined. The warning actuator signal 110 is connected to a portion of the identifier transmitter 80, the identifier transmitter 80 transmitting the warning signal ($WS_T$) in response thereto.

The transmitted warning signal ($WS_T$) is transferred to the vehicle unit 12 via the identifier transmit coupling 26a and the vehicle received coupling 50, the received warning signal ($WS_T$) being then transferred via the vehicle receiver 52 and the signal controller 56 to the warning detector 60. The warning detector 60 activates a portion of the audio-visual indicator 62 via the warning detector output signal 78 in response to the received signal controller output signal 76, thereby providing a driver-perceivable output indication indicative that the vehicle 14 has been identified and a determination has been made that the vehicle 14 is travelling at a rate in excess of the predetermined speed limit for that designated portion of the highway, or that the vehicle 14 is travelling in the wrong direction.

It should be noted that the error identification control 86 is constructed to disengage the various portions of the identifier unit 42 in the event the determination is made that the first-received emitted signal ($ES_T$) does not represent or is not encoded with a valid vehicle identification code, in the event that the second-received emitted signal ($ES_T$) does not represent or is not encoded with a valid vehicle identification code, or in the event that the first-received and the second-received emitted signals ($ES_T$) are not identical. In this manner, the identifier unit 42 and, more particularly, the error identification control 86 is constructed to substantially eliminate any possibility of error resulting from incoming signals received from foreign sources such as noise or the like, the identifier unit 42 being particularly constructed to process incoming data in such a manner that substantially all of the possibilities which might result in an erroneous determination are decided or determined in favor of the vehicle operator.

The vehicle speed and vehicle direction are transferred to the buffer storage along with the vehicle identification code and, in some instances, a special code is transferred to the buffer storage indicating that the valid-compared vehicle identification code corresponds to one of the vehicle identification codes stored in the permanent storage controller 92. This data, temporarily retained in the buffer storage 94, can be transferred to the district processor 20 and the central processor 22 via the communicating links 32 and 34, as mentioned before.

The synchronization control 88 receives the incoming data from the first receiver 82 and the second receiver 84 and it provides the input clock pulse 98 in response thereto, the input clock pulse 98 being utilized to clock the incoming data into digital shift register portions of the error identification control 86. The synchronization control 88 also provides the transfer clock pulse 101 which is activated in response to an indication that a valid vehicle identification code has been clocked into the shift registers of the error identification control via the first-received emitted signal ($ES_T$) or the second-received emitted signal ($ES_T$), the transfer clock pulse 101 being connected to a portion of the permanent storage controller 92 to activate a portion thereof for comparing the received vehicle identification code with vehicle identification codes permanently stored in a portion of the permanent storage controller 92. The transfer clock reset pulse 100 of the synchronization control 88 is activated via the absence of the first or the second channel valid data signals 104 or 106 to reset the error identification control 86 to receive incoming data, in one position, and indicating that the vehicle identification codes are valid, the first-received vehicle identification code compares with the second-received vehicle identification code, the vehicle identification code has been compared with the vehicle identification codes permanently stored in a portion of the permanent storage controller 92 and the vehicle identification code along with the determinations of the speed-direction control 90 have been transferred to the buffer storage 94, in one other aspect, in a manner to be described in greater detail below.

VEHICLE UNIT

The vehicle unit 12, diagrammatically shown in FIG. 1 and generally described before is shown in greater detail in FIGS. 2, 3, 4 and 5. As shown in FIG. 2, the vehicle receiver 52, more particularly, includes an amplifier 130 and a bandpass filter 132.

The amplifier 130 is constructed to receive the signal 66 from the vehicle receive coupling 50 and to provide an amplified output signal 134 in response thereto. The amplifier 130 is, in a preferred form, of the type generally known in the art as a high gain type of amplifier, and is designed to have a predetermined minimum signal strength threshold level, the amplified output signal 134 being produced when the signal strength level of the amplifier input signal 66 exceeds the predetermined minimum signal strength threshold level. The minimum signal strength threshold level of the amplifier 130 is, more particularly, determined such that when the identification encoder 54 and the signal controller 56 are each activated, the signal strength of the received transmit signal ($S_T$) is of a sufficient level such that the received emitted signal ($ES_T$) has a signal strength sufficient to activate the error identification control 86 of the identifier unit 42, as generally described before.

The bandpass filter 132 has a single transmission band, in a preferred form, and is constructed to attenuate frequencies on each side of the transmission or bandpass thereof, in a manner well known in the art. In a preferred form, the bandpass of the bandpass filter 132 is centered at the frequency of the transmit signal ($S_T$) generated via the identifier transmitter 80 of the identifier unit 42, the output signal from the bandpass 132 corresponding to the vehicle receiver output 68, described before with respect to FIG. 1.

As generally shown in FIG. 2, the signal controller 56 generally includes: a frequency translator 136 for translating the received transmit signal ($S_T$) and, more particularly, for translating the received vehicle receiver output signal 68 to an output signal 138, the frequency translator output signal 139 being coherently related to the received transmit signal ($S_T$); a pulse counter 140 receiving the frequency translator output signal 138 and providing an output pulse signal in response to a received predetermined number of input pulses thereto via the frequency translator output signal 138, the pulse counter output signal corresponding to the signal controller output signal 70; a detector and pulse counter 144 receiving the frequency translator output signal 138, and having one portion sensing the presence of the frequency translator output signal 138 and providing an output reset signal 146 in the sensed absence of the frequency translator output signal 138, and one other portion providing an output pulse signal 148 in response to a received predetermined number of input pulses thereto via the frequency translator output signal 138; a pulse counter 150 receiving the output signal 148 of the detector and pulse counter 144 and providing an output signal corresponding to the signal controller output signal 76 in response to a predetermined number of input pulses thereto via the detector and pulse counter output signal 148, and having a portion receiving the pulse counter output signal 70 and being reset thereby; and a modulator 152 receiving the frequency translator output signal 138 and the identification encoder output signal 72 and providing the signal controller output signal 74, the modulator 152, in a preferred form, being constructed to utilize the identification encoder output signal 72 to modulate the frequency translator output signal 138 in such a manner that the signal controller output signal 74, corresponding to the emitted signal ($ES_T$), has encoded therein the unique code stored in the identification encoder 54. Thus, in general, the signal controller 56 receives the vehicle receiver output signal 68 and includes: one portion for determining that the vehicle receiver output signal 68 corresponds to the transmit signal ($S_T$), that portion activating the identification encoder 54 and utilizing the output therefrom to modulate the frequency translator output signal 138 to provide the encoded emitted signal ($ES_T$), and one other portion for determining that the vehicle receiver output signal 68 corresponds to the warning signal (WS$_T$), sometimes referred to herein as the "modulation signal," that portion providing the signal controller output signal 76 to activate the warning detector 60 and the audio-visual indicator 62, in a manner to be described in greater detail below.

As shown in FIG. 4, the frequency translator 136, more particularly, includes: an amplifier 160 constructed to receive the vehicle receiver output 68 and to produce an amplifier output signal 162 in response thereto; a digital counter 164 constructed to produce an output pulse signal in response to a predetermined number of received input pulses, the digital counter output signal corresponding to the output signal 138 of the frequency translator 136; and a diode 166 interposed between the amplifier 160 and the digital counter 164 to eliminate the negative portion of the amplified output signal 162 prior to connecting the amplifier output signal to the digital counter 164. The digital counter 164, more particularly, divides the incoming signal frequency by a predetermined amount N, as indicated in FIG. 4; that is, the digital counter 164 produces an output pulse for every predetermined number N input pulses thereto, such devices being sometimes referred to in the art as dividers or digital countdown circuits, and the digital counter 164 being sometimes referred to herein as the "N-digital counter" 164, for the purpose of clarity. The frequency translator output signal 138 is thus coherently related to the transmit signal (S$_T$) by the factor N, and is therefore sometimes designated and referred to below as the frequency translator output signal (S$_T$/N).

It should be particularly noted that other methods of coherent frequency translation can be utilized to provide a frequency translator output signal 138 coherently related to the input transmit signal (S$_T$) in lieu of the N-digital counter 164, described above, such as an analog type of multiplying circuit for multiplying the incoming or transmit signal (S$_T$) frequency by the predetermined factor N, for example. However, in a preferred form, the N-digital counter 164 divides the incoming signal frequency by the factor N since it has been generally found that digital counting circuits of this nature are inherently more simple and more reliable in construction and operation as compared to a multiplying circuit of the analog type. Additional reason for utilizing the divider type of digital counting circuit for the N-digital counter 164, in a preferred form, rather than a multiplying circuit of the analog type, is that the utilization of the N-digital counter 164 eliminates the design requirement of including some type of automatic gain control circuitry in the vehicle unit 12 to compensate for variations in the signal strength of the received transmit signal (S$_T$) occurring as a result of the distance variations between the vehicle receive coupling 50 and the identifier transmit coupling 26 (26a) during the period of time when the moving vehicle unit 12 is in communicating proximity with the identifier coupling 24. In other words, when the vehicle 14 is first moved to a position wherein the vehicle unit 12 disposed therein is in communicating proximity with a particular identifier coupling 24 (when the vehicle 14 is initially positioned at the predetermined maximum distance of operation with respect to the identifier coupling 24), the signal strength of the vehicle receiver output signal 68 is smaller, compared to the signal strength of the vehicle receiver output signal 68 produced when the vehicle 14 is positioned at a minimum distance from the identifier coupling 24. This variation in signal strength of the vehicle receiver output signal 68 will cause the output of the diode 166 or, more particularly, the input signal to the N-digital counter 164 to have a distorted wave form. However, the signal distortion appearing at the input to the N-digital counter 164 is essentially removed by the N-digital counter 164, since a digital countdown type of circuit is constructed to operate only when the input signal thereto goes from a "high" to a "low" status thereby providing a symmetrical, non-distorted frequency translated output 138 even during those periods of time when a non-symmetrical vehicle receiver output signal 68 is connected to the frequency translator 136. Thus, utilizing the frequency translator 136 and, more particularly, the N-digital counter 164 before and shown in FIG. 4, the design requirement of including some form of automatic gain control circuitry to maintain the coherent relationship between the transmit signal (S$_T$) and the emitted signal (ES$_T$) is essentially eliminated with respect to the vehicle unit 12.

The pulse counter 140 of the signal controller 56 is, more particularly, an M-digital counter 140 which is constructed to provide an output pulse signal for every predetermined number of input pulses thereto and, more particularly, to provide an output pulse signal in response to a predetermined number M input pulses thereto, as diagrammatically indicated in FIG. 4. The output signal 70 of the M-digital counter 140 is thus coherently related to the transmit signal (S$_T$) by the factor M and, since the digital counter 140 receives the frequency translator output signal (S$_T$/N) 138, the signal controller output signal 70 is sometimes designated and referred to below as the "signal controller output signal (S$_T$/NM)" 70. Thus, with respect to the operation of the signal controller 56 to provide the emitted signal (ES$_T$), the signal controller 56 is, in a preferred form, constructed to produce two coherent frequency translated signals: one signal being the frequency translator output signal (S$_T$/N) 138 wherein the predetermined amount of coherent translation is represented by the letter designation N; and the other signal being the signal controller output signal (S$_T$/NM) 70, wherein the predetermined amount of coherent translation is represented by the letter designation NM, for reasons which will be made more apparent below.

The signal controller output signal (S$_T$/NM) 70 is connected to and received by the identification encoder 54, the identification encoder 54 being thus operated via an input signal having a frequency 1/NM times the frequency of the vehicle receiver output signal 68 or, in other words, the transmit signal (S$_T$). As shown in FIG. 3, the identifier encoder 54, in a preferred form, includes two permanently encoded digital shift registers; one shift register being designated in the drawings and referred to below as a first shift register 170, and the other shift register being designated in the drawings and referred to below as the second shift register 172. The first and the second shift registers 170 and 172 are each constructed to receive the signal controller output signal (S$_T$/NM) 70, and each shift register 170 and 172 utilizes a plurality of flip flop networks to perform a displacement or movement of a set of digits, as well known in the art.

The first and the second shift registers 170 and 172, in a preferred form, each have a predetermined number P stages, and the last stage of each shift register 170 and 172 is connected to the first stage thereof via a signal path 174 and 176, (the signal path 174 corresponding to the signal 72, as shown in FIG. 3) respectively, in such a manner that the first and the second shift registers 170 and 172 each produce a cyclic output repeated as a function of the incoming signal frequency and the number of stages in each shift register 170 and 172. Since the input signal to the first and the second shift registers 170 and 172 is, more particularly, the signal controller output signal ($S_T$/NM) 70 and further since each shift register 170 and 172 includes P stages, each shift register 170 and 172 produces a cyclic output signal which is repeated every (1/NMP) cycles of the incoming transmit signal ($S_T$), thereby providing a cyclic identification encoder output signal repeated every (1NMP) cycles of the transmit signal ($S_T$), for reasons to be made more apparent below.

The first and the second shift registers 170 and 172 of each vehicle unit are permanently encoded with a vehicle identification code corresponding to and uniquely identifying the particular vehicle (14) associated with that particular vehicle unit (12). In the operational embodiment of the invention described herein for monitoring vehicle traffic, the various vehicle units and, more particularly, the identification encoders 54 located therein must be capable of uniquely identifying a relatively large class of objects or, more particularly, vehicles. To accommodate the large class of objects to be uniquely identified via the particular identification code stored in the identification ecoder 54, the number P of stages in the first and the second shift registers 170 and 172, in a preferred form, is designed to be greater than: $\log_2$ [the number of objects (vehicles) to be identified]. For example, if the first shift register 170 and the second shift register 172 are each designed to have 31 stages ($P = 31$), then there would be available a determinable number of unique vehicle identification codes which could be permanently placed in each shift register 170 and 172, the number of vehicle identification codes being, more particularly, represented by the factor ($2^{31}$), a number greater than two-billion. It should be noted, however, than, in a preferred form, some of the stages in the first shift register 170 and the second shift register 172 are allocated or utilized for producing a unique code format which can subsequently be decoded and the allocated stages of the first shift register 170 and the second shift register 172, of course, could not be utilized as a portion of the designed, predetermined vehicle identification codes, the code format and the decoding technique will each be described in greater detail below.

The first shift register 170 and the second shift register 172 are identical and utilized in the identification encoder 54 to substantially reduce the possibility of an erroneous encoded emitted signal ($ES_T$) being produced via the vehicle unit 12. More particularly, the first and the second shift registers 170 and 172 are connected in parallel and the shift register output signals 72 and 176, the signals 72 and 176 being identical in an operative position of the shift registers 170 and 172, are utilized to automatically disengage the portion of the vehicle unit 12 producing the encoded emitted signal ($ES_T$) and, more particularly, the identification encoder 54 in the event of a malfunction in any one of the stages of the shift register 170 and 172. As shown in FIG. 3, the first shift register output signal 72 and the second shift register output signal 176 are each connected to the input of an exclusive OR gate 178, having an output signal 180 connected to the first shift register 170 and to the second shift register 172 to disengage each of the shift registers 170 and 172, in one position thereof.

The exclusive OR gate 178 is constructed to provide the output signal 180 in response to different input signals 72 and 176 thereto indicating that any one of the corresponding stages of the first and the second shift register 170 and 172 are not identical and thus indicating a malfunction of one of the shift registers 170 and 172, or, more particularly, indicating that a particular stage of one of the shift registers 170 and 172 has failed relative to the corresponding stage in the other shift register 170 and 172, the output signal 180 disengaging the shift registers 170 and 172 and deactivating that portion of the vehicle unit 12 producing the encoded emitted signal ($ES_T$). It should be particularly noted that, in a preferred form, the vehicle unit 12 is constructed such that the portion of the vehicle unit 12 receiving the warning signal ($WS_T$) and providing a driver-perceivable indication in response thereto remains activated or in an engaged position to receive and detect any warning signals ($WS_T$) transmitted via the identifier unit 42, this being a particularly desirable feature when the vehicle unit 12 is constructed to receive various warning signals ($WS_T$) indicative of various predetermined driver-informative data, as mentioned and generally described before.

The frequency translator output signal 138 and the identification encoder signal 72 are each connected to the modulator 152 and, more particularly, to the inputs of an AND gate 181, as shown in FIG. 4. The AND gate 181 receives the frequency translator output signal 138 and provides the output signal 74 therefrom corresponding to the frequency translator output signal 138 when simultaneously receiving the input signals 138 and 72. The identification encoder output signal 72 is thus utilized in cooperation with the AND gate 181 to modulate the frequency translator output signal 138 in such a manner that the vehicle identification code permanently stored in the identification encoder 54 is encoded in the modulator output signal 74, the modulator output signal 74 corresponding to the encoded emitted signal ($ES_T$).

As shown more clearly in FIG. 5, the detector and pulse counter 144, more particularly, includes a detector 182 and a digital counter 184, each constructed and connected to receive the frequency translator output signal ($S_T$/N) 138. The detector 182 has a minimum and a maximum output signal 146, and is constructed to receive the frequency translator output signal ($S_T$N) 138 and to provide a maximum output signal 146 in response thereto, the output signal of the detector 182 corresponding to the reset signal 146, described before. More particularly, the detector 182 is constructed to detect the frequency translator signal 138 and provide a "zero" detector output signal 146 unless a frequency translator output signal 138 is connected thereto. The detector output signal or reset signal 146 is connected to the M-digital counter 140, as described above, and is also connected to and received by a digital counter 184, the digital counter 184 being reset in response to a received minimum or zero detector output signal 146, for reasons to be made more apparent below.

The digital counter 184 is constructed to provide an output pulse signal in response to a predetermined number of input pulses thereto, in a manner similar to that described before with respect to the digital counters 140 and 164. The digital counter 184, more particularly, receives the frequency translator output signal 138 and provides the output pulse signal 148 in response to L input pulses thereto, the digital counter 184 being sometimes referred to below as the "L-digital counter 184." The predetermined L is, in a preferred form, less than the predetermined number M, for reasons to be made more apparent below.

As shown in FIG. 5, the digital counter 150 is, more particularly, constructed to receive the output pulse signal 148 from the L-digital counter 184 and to provide an output signal 76 in response to a predetermined number Q input pulses thereto, the digital counter 150 being sometimes referred to as the "Q-digital counter 150." The Q-digital counter 150 is also connected to and receives the output pulse signal 70 from the M-digital counter 140, the Q-digital counter 150 being reset in response to a received signal 70 from the M-digital counter 140, for reasons to be made more apparent below.

The Q-digital counter 150 cooperates with the L-digital counter 184, the M-digital counter 140 and the detector 182 to provide the output signal 76 therefrom in response to the warning signal ($WS_T$), a modulated signal amplitude modulated in a manner sufficient to produce L pulses and insufficient to produce M pulses having a pulse interval of sufficient length between the produced pulses or, in other words, returning to a minimum or zero for a sufficient period of time between the produced pulses to be detected by the detector 182 thereby producing the minimum or zero detector output signal 146. Thus, the signal controller 56 and the warning detector 60 provide an exacting and flexible pulse width discriminator (the digital counters 140, 150 and 184 and the detector 182) which is operative in response to a received, particular modulation signal or warning signal ($WS_T$) to provide the warning detector output signal 78. The predetermined value of Q controls the period of time required for the signal controller 56 and the warning detector 60 to detect the received modulation signal, and within limits controlled by a particular operational embodiment, the value of Q can be increased to increase the period of time required to detect the received modulation signal to avoid inadvertent activation of the warning detector 60 by spurious modulated signals which might be similar to the modulated warning signal generated and transmitted by the identifier unit 42. It should also be noted that the signal controller 56 and the warning detector 60, in one form, include a plurality of pulse width discriminators, each being constructed to detect one of a plurality of modulation signals generated and transmitted by the identifier unit 42 and each providing an output signal, similar to the output signal 76 to activate a predetermined portion of the audio-visual indicator 62, thereby providing a plurality of driver-perceivable output indications each indicative of predetermined information to be communicated to the vehicle.

The warning detector 60 receiving the signal controller output signal 76, more particularly, includes: a driver 188, a latching relay 190, and a power supply 192, as shown more clearly in FIG. 5. The driver 188 is constructed to receive and amplify the signal controller output signal 76 and to supply power to activate the latching relay 190 in response thereto, the latching relay 190 being constructed to connect a power supply 192 to the audio-visual indicator 62 in an activated position thereof, thereby activating the audio-visual indicator 62 to provide the driver-perceivable output indications, mentioned before.

In one form and referring more particularly to the operational embodiment of the invention diagrammatically shown in FIG. 1, the power supply 192 can be the vehicle battery power supply, for example, and the latching relay 190, in one form, is constructed such that the latching relay 190 must be manually reset by the vehicle operator to a deactivated status, the deactivated status of the latching relay 190 being diagrammatically shown in FIG. 5. In one other form, the warning detector 60 can include a timer network (not shown) to automatically return the latching relay 190 to the deactivated status after a predetermined lapse of time, the construction and the connection of such a timer network will be apparent to those skilled in the art in view of the detailed description of the invention contained herein.

It should also be particularly noted that the N-digital counter 164, the M-digital counter 140, the L-digital counter 184 and the Q-digital counter 150 are, in a preferred form, particularly constructed to be of the digital countdown type of apparatus, as described before, to eliminate the design requirement of having an oscillator or other such signal generating device in the vehicle unit 12 to produce the encoded signal to be received by the identifier unit 42 and to eliminate the design requirement of providing special timing circuits in the vehicle units to be responsive to the identifier transmit signal ($S_T$). The vehicle unit 12, described before, is constructed to automatically maintain frequency synchronization with the frequencies of the signals generated and transmitted via the identifier unit 42 by predetermining the amount of frequency translation produced by the digital counters 164, 140, 184 and 150. For example, the operational embodiment shown in FIG. 1 and vehicle unit 12 shown in FIGS. 2, 3, 4 and 5, are constructed to operate in cooperation with a signal frequency generated and transmitted via the identifier unit 42 generally between one cycle per second and several million cycles per second without substantial modifications to the vehicle unit 12 other than locating the bandpass filter 132 to be centered at the proper frequency. However, referring particularly to the operational embodiment of the invention shown in FIG. 1, the lower practical limit is determined by such factors as vehicle speeds and the amount of information to be communicated during the time the vehicle unit is in communicating proximity with a particular identifier coupling, the practical lower limit for the identifier unit 42 transmit frequency being approximately 80 KHz and the practical upper limit being approximately 400 KHz, to substantially avoid interference with standard broadcast frequencies, for example. The theoretical upper frequency limit is determined by such factors as, for example, the speed of available digital devices and is approximately in the range of 10 to 50 MHz (the range being constantly changing as result of various technical advances in the art).

OPERATION OF THE VEHICLE UNIT

The vehicle unit 12 receives transmitted signals and emits an encoded signal in response to one particular received, transmitted signal, in one form, and provides a driver-perceivable indication via the audio-visual indicator 62 in response to one other particular received, modulated signal or warning signal ($WS_T$). More particularly, the vehicle unit 12 is constructed to receive the transmit signal ($S_T$) and to emit the encoded emitted signal ($ES_T$) in response thereto, and to receive the transmitted warning signal ($WS_T$) and to provide the driver-perceivable indication via the audio-visual indicator 62 in response to the received warning ($WS_T$). It should again be emphasized that the encoded emitted signal ($ES_T$), in a preferred form, is coherently related to the received, transmit signal ($S_T$), in a manner described before.

Since the various signals received by the vehicle unit 12 are connected to the signal controller 56 via the vehicle receiver 52 which includes the bandpass filter 132 having a pass band centered at the frequency of the transmit signal ($S_T$), only those received signals having a frequency within the pass band are connected to the signal controller 56 via the signal path 68, the various other received signals being attenuated via the bandpass filter 132. Further, only those received signals having a signal strength exceeding the threshold of the amplifier 130 are amplified and connected to the bandpass filter 132.

The received transmit signals ($S_T$) and the received warning signals ($WS_T$), having a signal strength in excess of the amplifier 130 threshold, are thus each connected to the signal controller 56. The received signals are amplified via the amplifier 160 and the negative voltage is eliminated therefrom via the diode 166 of the frequency translator 136. The incoming signal frequency of the transmit signal ($S_T$) and the warning signal ($WS_T$) is then coherently translated via the N-digital counter 164 to provide the signal controller output signal 138.

Initially assuming that the vehicle unit 12 receives the transmit signal ($S_T$), the frequency translator output signal 138 is connected to and further translated via the M-digital counter 140, the output signal 70 of the M-digital counter 140 being connected to and activating the identification encoder 54. The identification encoder 54 is activated and operated at a frequency which is NM less than the frequency of the incoming transmit signal ($S_T$) providing the cyclic identification encoder output signal 72. The identification encoder output signal 72 and the frequency translator output signal 138 are each applied to the input of the AND gate 181, the identification encoder output signal 72 being utilized to modulate the frequency translator output signal 138 to provide the emitted signal ($ES_T$) 74 encoded with the unique, predetermined vehicle identification code stored in the identification encoder 54. The modulator output signal 74 is connected to the vehicle transmit coupling 58, the vehicle transmit coupling 58 providing the means to couple or transfer the produced signal ($ES_T$) to the identifier unit 42, as mentioned before.

In a preferred form, the warning signal ($WS_T$) is produced by amplitude modulating the transmit signal ($S_T$) and thus the warning signal ($WS_T$) has a frequency corresponding to the frequency of the transmit signal ($S_T$). Therefore, the received warning signal ($WS_T$) is also passed by the bandpass filter 132 and connected to the signal controller 56 via the signal path 68, in a manner similar to that described before with respect to the received transmit signal ($S_T$).

The received warning signal ($WS_T$) is amplified by the amplifier 160, the negative voltage is eliminated therefrom by the diode 166 and the received warning signal ($WS_T$) is frequency translated via the N-digital counter 164 to provide a frequency translator output signal ($WS_T/N$) 138. The frequency translator output signal 138 is further translated by the M-digital counter 140 to provide the signal controller output signal $WS_T/NM$) 70, which is connected to the Q-digital counter 150 and to the identification encoder 54. The frequency translator output signal 138 is also connected to the detector 182 and to the L-digital counter 184. The pulse width discriminator comprising the digital counters 140, 150 and 184 and the detector 182 cooperates detect the amplitude modulated warning signal ($WS_T$) and produce the output signal 76 in response thereto.

The signal controller output signal 76 activates the latching relay 190 to connect the power supply 192 to the audio-visual indicator 62 via the signal path 78 therebetween. In response to the received warning detector output signal 78, the audio-visual indicator 62 is activated to provide the driver-perceivable indications, described before.

It should also be noted that, in the event the frequency translator output signal 138 produces M pulses as well as L pulses, the Q-digital counter 150 will be reset via the M-digital counter output signal 70. In this manner, the signal controller 56 of the vehicle unit 12 is constructed such that the warning detector 60 is only operative when the received signal is amplitude modulated in such a manner that the duration of the modulated signal is sufficient to produce L pulses but insufficient to produce M pulses, as mentioned before.

CONSTRUCTION AND OPERATION OF THE IDENTIFIER UNIT

The identifier unit 42 is constructed to generate and transmit the transmit signal ($S_T$) and the warning signal ($WS_T$) or, in one form, a plurality of warning signals ($WS_T$), each modulated in a manner such that each warning signal ($WS_T$) is detectable and identifiable via the pulse width detector of the vehicle unit 12, the identifier unit 42 also being constructed to receive the emitted signal ($ES_T$) emitted via the vehicle units. With respect to receiving the emitted signals ($ES_T$) from the vehicle units 12, the identifier unit 42 is, more particularly, constructed to receive, decode, analyze and store data relating to the encoded emitted signal ($ES_T$) from the vehicle unit 12. The identifier unit 42, described generally before with respect to the operational embodiment diagrammatically shown in FIG. 1, is diagrammatically shown in more detail in FIG. 6, the various assemblies being shown in greater detail in FIGS. 7 through 16.

Figure 6:
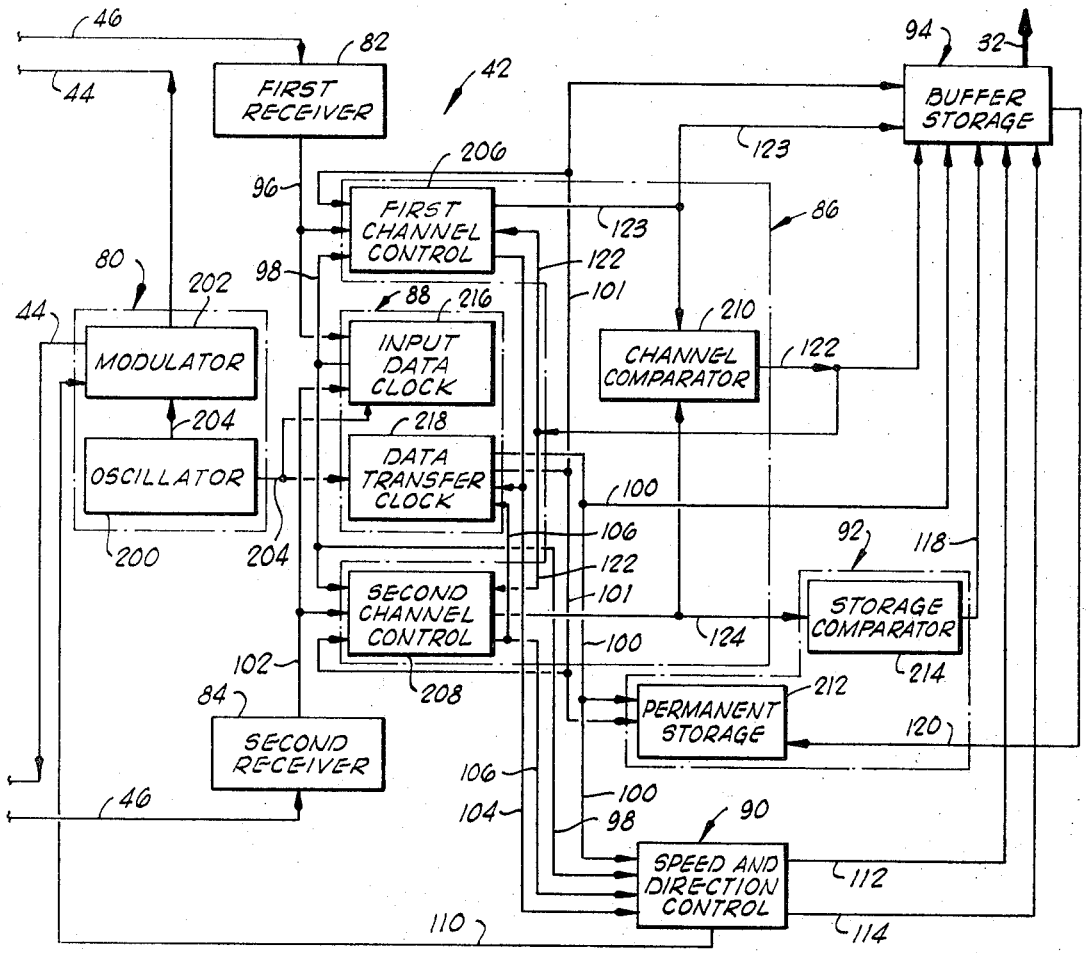
FIG. 6 is a diagrammatical view showing the construction of the identifier unit of FIG. 1 in greater detail.

The identifier transmitter 80, as shown in FIG. 6, includes an oscillator 200 and a modulator 202. In a preferred form, the oscillator 200 is constructed to produce a single frequency signal 204, the oscillator output signal 204 being transmitted from the identifier unit 42 via the signal path 44 through the modulator 202. The modulator 202 is constructed to receive the speed-direction control output signal 110 and to be activated thereby to amplitude modulate the oscillator output signal 204 in such a manner that the identifier transmitter 80 generates and transmits a signal corresponding to the warning signal ($WS_T$).

As shown in FIG. 6, the error identification control 86 generally includes: a first channel control 206; a second channel control 208; and a channel comparator 210. The permanent storage controller 92 of the identifier unit 42 includes a permanent storage 212 and a storage comparator 214; and the synchronization control 88 generally includes: an input data clock 216 and a transfer data clock 218.

The first receiver 82 and the second receiver 84 each include an amplifier for amplifying the received emitted signal ($ES_T$), a bandpass filter for receiving the amplified output of the amplifier and having a pass band substantially centered at the frequency of the encoded emitted signal ($ES_T$) emitted via the vehicle units 12 and a threshold detector for receiving the filter output signal, the first receiver providing the output signal 96 in response to a first-received emitted signal ($ES_T$) and the second receiver 84 providing the output signal 102 in response to the second-received emitted signal ($ES_T$). A typical receiver 82 or 84 is diagrammatically shown in FIG. 7, the receiver 82 or 84 including: an amplifier 220 constructed and connected to receive the emitted signals ($ES_T$) and to provide an output signal 222 in response thereto; a bandpass filter 224 receiving the amplified output signal 222 and providing an output signal 226 when the frequency of the received amplifier output signal 222 is within the designed pass band of the bandpass filter 224; and a detector 228 receiving the filter output signal 226 and providing the receiver output signal when the signal strength of the received emitted signal ($ES_T$) exceeds a predetermined threshold level, the threshold level being determined to substantially eliminate relatively low strength signals commonly referred to as "ambient noise." The receiver 82 or 84, diagrammatically shown in FIG. 7, has a receiver output signal 96 being provided via the first receiver 82 and the receiver output signal 102 being provided via the second receiver 84.

More particularly, each bandpass filter 224 is constructed to have a pass band centered at a frequency which is a predetermined number 1/N times less than the frequency of the transmit signal ($S_T$) or, in other words, to have a pass band which is centered at a frequency substantially corresponding to the frequency of the encoded emitted signal ($ES_T$) emitted via the vehicle unit 12, described before. The bandpass filter 224 is also constructed, in a preferred form, such that the pass band thereof is (1/NM) times the frequency of the transmit signal ($S_T$), wherein the predetermined factor M corresponds to the predetermined factor M of the M-digital counter 140, described before with respect to the vehicle unit 12. It will be apparent to those skilled in the art from the foregoing that the pass band (1/NM) corresponds to the modulation period of the vehicle identification code; that is the modulation period of the identification encoder output signal 72. The bandpass filter 224 is thus optimumly matched to receive data or information emitted from the vehicle unit 12, since the bandpass filter 224 is centered at the frequency of the frequency translator output signal 138 and the pass band thereof corresponds to the modulation period of the vehicle identification code being emitted from the vehicle unit 12 in response to a received transmit signal ($S_T$).

The output signal 96 of the first receiver 82 and the output signal 102 of the second receiver 84 are each connected to the input data clock 216, as generally shown in FIG. 6 and as shown in more detail in FIG. 7. The input data clock 216 includes: an exclusive OR gate 230, the output signal 96 of the first receiver 82 and the output signal 102 of the second receiver 84 each being connected to the input of the exclusive OR gate 230; a digital counter 232 which is constructed to receive the oscillator output signal 204 and to provide an output signal 234 or, more particularly, an output pulse for every predetermined number of input pulses thereto produced via the oscillator 200; a digital counter 236 and a digital counter 238, the digital counters 236 and 238 each being similarly constructed to receive the digital counter output signal 234 and to provide an output signal 240 and 242, respectively, for every predetermined number of input pulses applied thereto via the oscillator 200 and digital counter 232; a pair of AND gates 244 and 246, each AND gate 244 and 246 having an output pulse signal 248 and 250, respectively, in response to a predetermined number of input pulses applied thereto via the digital counters 236 and 238; an OR gate 252 having an input connected to receive the output pulse signals 248 and 250 of the AND gates 244 and 246, respectively, and to provide the input data clock synchronization signal 98; and an inverter 254 connected between the exclusive OR gate 230 and the digital counter 236.

Thus, the first receiver output signal 96 and the second receiver output signal 102 are each received by the exclusive OR gate 230, and the exclusive OR gate 230 is constructed to provide an output signal 256 when receiving an input signal from either the first receiver 82 or the second receiver 84. The exclusive OR gate 230, of course, will not provide the output signal 256 when receiving an input signal from the first and the second receivers 82 and 84 simultaneously. During the normal operation of the identifier unit 42, any one particular vehicle unit 12 will be in communicating proximity with only one of the identifier couplings 24 at any one instant, thereby activating either the first receiver 82 or the second receiver 84 to provide either the first receiver output signal 96 or the second receiver output signal 102, but not both. Therefore, the input to the exclusive OR gate 230 will be either the first receiver output signal 96 or the second receiver output signal 102 during the normal operation of the identifier unit 42, and the output signal 256 will thus be provided from the exclusive OR gate 230.

The output signal 256 of the exclusive OR gate 230 provides a "common mode rejection signal" which is utilized to render a portion of the identifier unit 42 inoperative when signals are being received via the first and the second receivers 82 and 84 simultaneously. Referring to the operational embodiment shown in the drawings, signals received from the first and the second receivers 82 and 84 simultaneously can be caused, in some instances, by a malfunction of the first or the second receivers 82 and 84 or, in some other instances, can be caused by extraneous signals being temporarily received from some foreign source with respect to the vehicle identification and warning apparatus 10. In any event, the output signal 256 of the exclusive OR gate 230 is utilized to disengage the input data clock 216 from a portion of the first channel control 206 and a portion of the second channel control 208, in a manner and for reasons which will be made more apparent below.

The output signal 256 of the exclusive OR gate 230 is connected to the digital counter 236 via the inverter 254 and is directly connected to the digital counter 238. The inverter 254 is, more particularly, constructed to invert the input thereto or, in other words, to provide a "low" output signal when the input signal from the exclusive OR gate 230 thereto is "high" and, by the same token, to provide a "high" output signal therefrom when the input signal thereto from the exclusive OR gate 230 is "low," this type of inverter being sometimes referred to in the art as a NOT circuit since the output thereof is the reverse of the input thereto. Thus, the digital counter 236 is operative or, in other words, a signal is provided to the input thereof via the inverter 254 when there is no data pulse signal 256 provided via the exclusive OR gate 230. Thus, the digital counter 236 is operative in response to an absence of a data pulse signal 256 and the digital counter 238 is operative in response to a received data pulse signal 256, for reasons to be made more apparent below.

The digital counter 232 is, more particularly, constructed to translate the oscillator output signal 204 received thereby by a predetermined amount N as indicated in FIG. 7, the predetermined number N corresponding to the number N described before with respect to the N-digital counter 164 of the vehicle unit 12. The digital counter 232 thus translates the frequency of the oscillator output signal 204, which corresponds to the frequency of the transmit signal ($S_T$), in a manner providing the output signal 234 therefrom corresponding to the frequency translation produced in the vehicle unit 12 via the frequency translator 136, described before.

The digital counters 236 and 238 are each constructed to further translate the digital counter output signal 234 by a predetermined amount M, which corresponds to the frequency translation produced via the digital counter 140 of the vehicle unit 12, described before. As diagrammatically shown in FIG. 7, the M output stages of the digital counters 236 and 238 are each applied to the input of the AND gate 244 and 246, respectively, to obtain a clock pulse which is (1/M) as wide as the data pulses being received by the first receiver 82 and the second receiver 84 from the vehicle unit 12.

During the operation of the identifier unit 42, an incoming, encoded emitted signal ($ES_T$) is received via the first receiver 82 or the second receiver 84, and the first receiver output signal 96 or the second receiver output signal 102 is applied to the input of the exclusive OR gate 230, thereby producing the output signal 256 therefrom. When an output signal 256 is produced from the exclusive OR gate 230, the digital counter 238 is in the operative mode, receiving the exclusive OR gate output signal 256. The digital counter 238 is also receiving the output signal 234, which corresponds to the oscillator output signal translated by a predetermined amount N via the digital counter 232. In the operative mode, the digital counter 238 counts the pulses of the frequency translated output signal 234 and provides the output signal 242 for every M input pulses applied thereto. During those periods of operation when no data pulse is being received by the exclusive OR gate 230 or, in other words, when neither the first receiver nor the second receiver 82 and 84 are receiving encoded emitted signal ($ES_T$) from the vehicle unit 12, an input signal is applied to the digital counter 236 via the inverter 254 and the digital counter 236 thus counts the input pulses thereto of the oscillator output signal translated by an amount N appearing on the output signal 234 from the digital counter 232, and provides the output signal 240 for every M input pulses applied thereto. The AND gates 244 and 246 are each constructed such that a pulse appears on the signal outputs therefrom 248 and 250, respectively, after (M/2) pulses are produced via the oscillator output signals translated by an amount N.

The input data clock pulse 98 produced via the input data clock 216 is connected to a portion of the first channel control 206 and a portion of the second channel control 208. Since the AND gates 244 and 246 are constructed such that a pulse appears at the outputs thereof after (M/2) input pulses via the digital counter output signal 234, the input data clock 216 thus produces the input data clock pulse 98 which is shaped such that a data clock pulse of the input data clock pulse 98 is received by a portion of the first channel control 206 and by a portion of the second channel control 208 subsequent to the first pulse being received by the first channel control 206 and the second channel control 208 via the first receiver output signal 96 and the second receiver output signal 102, respectively, the clock pulse of the input data clock pulse 98 arriving at the first channel control 206 and the second channel control 208 prior to the arrival of the next received pulse via the first receiver output signal 96 and the second receiver output signal 102, respectively. More particularly, the AND gate output signal 250 provides a "data pulse" input data clock pulse 98 to a portion of the first and the second channel controls 206 and 208, during one operative position of the input data clock 216, and the AND gate output signal 248 provides a "no data pulse" input data clock pulse 98 to a portion of the first and the second channel controls 206 and 208, during one other operative position of the input data clock 216. The term "data pulse" refers to a binary code value of "one," and the term "no-data pulse" refers to a binary code value of "zero," midway between a no-data pulse corresponding to the midpoint of a no-data pulse. Since the digital counters 236 and 238 do not operate simultaneously during the normal operation of the identifier unit 42, the output signals 248 and 250 therefrom are each applied to the OR gate 252, the input data clock pulse 98 being supplied to the first channel control 206 and to the second channel control 208 via the output of the OR gate 252.

The input data clock pulse 98 provides the clock pulse for clocking data into the first and the second channel controls 206 and 208, the input data clock pulse 98 also being connected to the speed-direction control 90 for operating the speed-direction control 90 in response to signals received from the first and the second channel controls 206 and 208, as shown in FIGS. 1 and 6. Utilizing a single signal generating apparatus or, more particularly, the single oscillator 200 to operate the vehicle unit 12 and the identifier unit 42, input data synchronization is accomplished in a relatively simple, economical and reliable manner, substantially independent of the frequency of the oscillator output signal 204.

Figure 9:
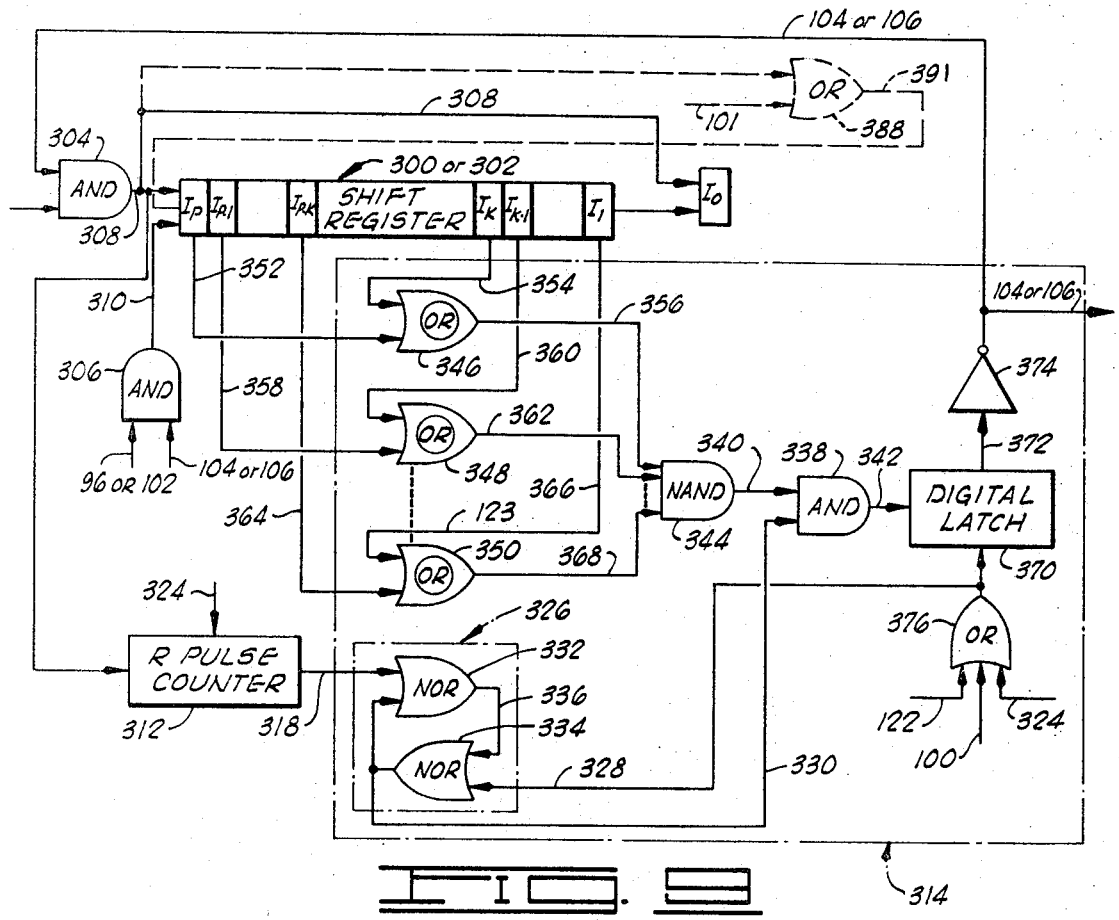
FIG. 9 is a diagrammatical view showing a typical portion of the first and the second channel control of the identifier unit of FIGS. 1 and 6, for receiving the incoming, encoded emitted signals and determining that the received data is in the form of a valid vehicle identification code.

In a preferred form, the first channel control 206 is constructed similar to the second channel control 208, the first channel control 206 including a first channel sh8ift register 300 and the second channel control 208 including a second channel shift register 302, as diagrammatically shown in FIGS. 8, 9, 10 and 11, a typical portion of the first or the second channel control 206 and 208 being shown in FIGS. 8 and 9. The first channel control 206 and the second channel control 208 each include: a first AND gate 304 and a second AND gate 306, the first AND gate 304 being constructed to receive the first or the second channel valid data signal 104 or 106 (the first AND gate 304 of the first channel control 206 receiving the first channel valid data signal 104 and the first AND gate 304 of the second channel control 208 receiving the second channel valid data signal 106), and the input data clock pulse 98 and to provide an output signal 308 therefrom in response to simultaneously received input signals thereto and the second AND gate 306 being connected to receive the incoming signal 96 or 102 from the first receiver 82 or the second receiver 84, respectively, (the second AND gate 306 of the first channel control 206 receiving the incoming signal 96 and the second AND gate 306 of the second channel 96 and the second AND gate 306 of the second channel control 208 receiving the incoming signal 102), and the first or the second channel valid data signal 104 or 106 from the data transfer clock 218 and to provide an output signal 310 therefrom in response to simultaneously received input signals (the second AND gate 306 of the first channel control receiving the first channel valid data signal 104 and the second AND gate 306 of the second channel control 208 receiving the second channel valid data signal 106).

The first channel shift register 300 and the second channel shift register 302 are each similarly constructed, and each includes a predetermined number P digital shift register stages corresponding to the predetermined number P stages of the first and the second shift registers 170 and 172, shown in FIG. 3. The digital shift register stages of the first and the second channel shift registers 300 and 302 are generally referred to below and diagrammatically designated in the drawings as $I_P$, $I_{P-1}$ . . . $I_1$ wherein $I_P$ refers to the $P^{th}$ stage and $I_{P-1}$ refers to the P−1 stage progressively, the shift register stages and the unique code format to be described in greater detail below.

Referring more particularly to the first channel shift register 300 of the first channel control 206, the first channel shift register 300 is connected to receive the output signal 308 of the first AND gate 304 and to receive the output signal 310 of the second AND gate 306 such that when a vehicle identification code data pulse arrives at the input to the second AND gate 306 via the output signal 96 from the first receiver 82, and the first channel valid data signal 104 is also received by the second AND gate 306, a data pulse is produced on the output signal 310 of the second AND gate 306 which is the input to the Pth digital shift register stage of the first channel shift register 300. Subsequently, an input clock pulse 98 is produced via the input data clock 216, in a manner described before, and a first channel valid data signal 104 is also received by the first AND gate 304, producing a data clock pulse on the output signal 308 of the first AND gate 304. The data pulse initially on the output signal 310 of the second AND gate 306 is placed in the $I_P$ digital shift register stage of the first channel shift register 300, and the data pulse previously in the $I_P$ digital shift register stage of the first channel shift register 300 is placed in the $I_{P-1}$ digital shift register stage, in a manner well known in the art. The data pulses on the output signals 308 and 310 of the first and the second AND gates 304 and 306 of the second channel shift register 302 are each alternately connected to the $P^{th}$ digital shift register stage of the second channel shift register 302 in a manner similar to that described above with respect to the first channel shift register 300, the salient difference being that the incoming signal 102 from the second receiver 84 is connected to the input of the second AND gate 306 of the second channel control 208.

The first and the second channel controls 206 and 208 also each include a pulse counter 312, a valid identification control 314 and an exclusive OR gate 316, as diagrammatically shown in FIG. 8. The output signal 308 of the first AND gate 304 is also connected to the input of the pulse counter 312, and thus a data clock pulse is applied to the pulse counter 312 each time the data clock pulse on the output signal 308 is connected to the channel shift register 300 or 302. The pulse counter 312 is constructed to provide a pulse counter output signal 318 in response to receiving a predetermined number of input pulses thereto via the first AND gate output signal 308, the predetermined number of input pulses being more particularly referred to below and designated in the drawings by R and the pulse counter 312 being sometimes referred to below as an "R-pulse counter 312."

The exclusive OR gate 316 is constructed and connected to receive input signals 320 and 322, the input signal 320 corresponding to the data in the digital shift register stage $I_0$ and the input signal 322 corresponding to the data in the digital shift register stage $I_P$. The exclusive OR gate 316 provides an R pulse counter reset signal 324 in response to a received input signal 320 or 322, the R pulse counter reset signal 324 being connected to the R-pulse counter 312 to reset the R-pulse counter 312, in a manner and for reasons to be made more apparent below.

Referring to the operational embodiment of the invention diagrammatically shown in FIG. 1, and particularly to the identification encoder 54 shown in FIG. 3, the first shift register 170 and the second shift register 172 of the identification encoder 54 each includes P shift register stages, and the output digital shift register stage of each shift register 170 and 172 is connected to the input digital shift register stage to produce a cyclic identification encoder output signal 72, the cyclic code being of a length determined by the number of digital shift register stages P. In other words, the identification encoder 54 produces a cyclic code of length P stages via the identification encoder output signal 72 therefrom, wherein the term "cyclic code of length P stages" is utilized to designate a time series of data pulses and non-data pulses produced on the identification encoder output signal 72 which are repeated after P pulses have been applied to the input of the shift registers 170 and 172, since the outputs of the shift registers 170 and 172 are each connected to the inputs of the shift registers 170 and 172, respectively, and the shift registers 170 and 172 are each P digital shift register stages long. Thus, a data pulse representative of a valid vehicle identification code on the incoming signal 96 from the first receiver 82 and a data pulse on the incoming signal 102 from the second receiver 84 representing a valid vehicle identification code must each repeat after every P data clock pulses and, since the digital shift register stage $I_o$ is the (P + 1) digital shift register stage, the data pulse or no-data pulse occurring in the stages $I_P$ and $I_o$ must be identical if a valid vehicle identification code is being received by the first channel control 206 via the incoming signal 96 and by the second channel control 208 via the incoming signal 102.

Thus, in the event that the input signals 320 and 322 from the $I_o$ and the $I_P$ digital shift register stages are identical, the R pulse counter reset signal 324 from the exclusive OR gate 316 will be "zero" (0), thereby allowing the R-pulse counter 312 to operate or positioning the pulse counter 312 in the operative mode. However, in the event that the input signals 320 and 322 from the $I_o$ and the $I_P$ digital shift register stages of the first or the second channel shift register 300 or 302 are not identical, thereby indicating that the incoming signal from the first receiver 82 or the second receiver 84 does not represent a valid vehicle identification code, an R pulse counter reset signal 324 is produced from the exclusive OR gate 316, thereby resetting the R-pulse counter 312. After the R-pulse counter 312 has been reset, R data pulses must then subsequently be clocked into the first channel shift register 300 or the second channel shift register 302 before the R-pulse counter output signal 318 is produced, the R-pulse counter output signal 318 being connected to the valid identification control 314, as described before.

Thus, the first channel control 206 and the second channel control 208 are constructed such that a pulse counter output signal 318 is produced in response to a predetermined number R data pulses entering the $I_P$ digital shift register stage identical to the predetermined number R data pulse entering the $I_o$ digital shift register stage of the first channel and the second channel shift register 300 and 302, respectively, this occurring only when the data is cyclic of length R stages. In a preferred form, the first and the second channel controls 206 and 208 are each contructed such that R is greater than P, and, in this form, the R-pulse counter output signal 318 is produced only in the event that the vehicle identification code encoded on the signal being received by the first and the second channel controls 206 and 208 is repeated at least one complete time during the operation of the identifier unit 42. For example, if the error identification control 86 is constructed such that R is equal to 2P, and P is equal to 48 digital shift register stages, then 96 data pulses are required in which the data leaving the $I_1$ digital shift register stage is identical to the data entering the $I_P$ digital shift register stage. The first and the second channel controls 206 and 208 are each constructed such that repeateable data must be clocked into the first and the second channel shift registers 300 and 302 before the R-pulse counter output signal 318 is produced and connected to the valid identification control 314. The repeatable data requirement of the error identification control 86, described before, substantially reduces the opportunity of random noise signals entering the first and the second channel shift registers 300 and 302, in a more efficient and more economical manner.

As shown more clearly in FIG. 9, the valid identification control 314 includes a digital latch 326 having a portion receiving the R-pulse counter output signal 318 and another portion receiving a signal 328. The digital latch 326 includes two NOR gates 322 and 334, the NOR gate 332 having the R-pulse counter output signal 318 and the output signal 330 of the NOR gate 334 connected to the input thereof and providing an output signal 336 therefrom when the input signals 318 and 330 are each zero (0) or in a "low" state; the NOR gate 334 having the output signal 336 of the NOR gate 332 and the signal 328 connected to the input thereof and providing the digital latch output signal 330 therefrom when the input signals 336 and 328 are each zero (0) or in a "low" stage. The digital latch 326 is set to a "high" state, and thus is constructed to return to the "low" state thereof in response to a signal 328 received thereby, in a manner well known in the art and for reasons which will be made more apparent below.

In the "high" state of the digital latch 326, the digital latch 326 provides the output signal 330 therefrom, the output signal 330 being connected to the input of an AND gate 338, as shown in FIG. 9. A signal 340 is also connected to the input of the AND gate 338, the AND gate 338 providing an output signal 342 in response to the input signals 330 and 342 being received simultaneously thereby.

The signal 340 input to the AND gate 338 is produced via a NAND gate 344 in response to the absence of a signal being received thereby. More particularly, the NAND gate 344 has a predetermined number of inputs, designated below by predetermined number reference K, and therefore each of the inputs connected to the K input NAND gate 344 must not have a signal produced thereon, if the output signal 340 is to be produced from the NAND gate 344, the K input signals being produced via K exclusive OR gates, in a manner to be described in greater detail below.

The valid identification control 314 includes a predetermined number K exclusive OR gates, three of the exclusive OR gates 346, 348, and 350 being shown in FIG. 9, for the purpose of clarity of description. The exclusive OR gate 346 has inputs 352 and 354 connected thereto from $I_P$ and the $I_K$ digital shift register stage, respectively, of the shift register 300 or 302, the exclusive OR gate 346 providing an output signal 356 in response to an input signal 352 or 354; however, if the data in the $I_P$ digital shift register stage is identical to the data in the $I_K$ digital shift register stage, both input signals 352 and 354 are simultaneously applied to the input of the exclusive OR gate 346 and the output signal 356 is thus not produced therefrom. In a similar manner, the exclusive OR gate 348 has inputs 358 and 360 connected thereto from the $I_{P-1}$ and the $I_{K-1}$ digital shift register stage, respectively, of the digital shift register 300 or 302, the exclusive OR gate 348 providing an output signal 362 in response to an input signal 358 or 360; and the exclusive OR gate 350 has inputs 364 and 366 connected thereto from the $I_{P-K}$ and the $I_1$ digital shift register stage, respectively, the exclusive OR gate 350 providing an output signal 368 in response to an input signal 364 or 366. Thus, if the data in the $I_{P-1}$ and the $I_{K-1}$ digital shift register stages is identical, the output signal 362 is not produced via the exclusive OR gate 348; and, if the data in the $I_{P-K}$ and the $I_1$ digital shift register stages is identical, the output signal 368 is not produced via the exclusive OR gate 350. The inputs to the remaining K exclusive OR gates, not shown in the drawings, are connected to designated corresponding digital shift register stages in a manner similar to that described before with respect to the exclusive OR gates 346, 348, and 350, and each of the K output signals (three input signals 356, 362, and 368 being shown in FIG. 9) will be in a "low" state, if the respective inputs thereto are identical indicating identical data in designated corresponding digital shift register stages, thereby producing the NAND gate output signal 340, for reasons to be described in greater detail below.

When the NAND gate output signal 340 is connected to the AND gate 338 and the digital latch output signal 330 is in the "high" state, the AND gate output signal 342 is connected to and received by a digital latch 370. The digital latch 370 is constructed to provide an output signal 372 in response to a received signal 342 from the AND gate 338.

The output signal 372 of the digital latch 370 is connected to a signal inverter 374, the signal inverter 374 being constructed to receive the digital latch output signal 372 and produce a "low" output signal 104 or 106 therefrom when the digital latch output signal 372 is in the "high" state and to produce a "high" output signal 104 or 106 therefrom when the digital latch output signal 372 is in the "low" state (the first channel valid data signal 104 being produced via the valid identification control 314 of the first channel control 206 and the second channel valid data signal 106 being produced via the valid identification control 314 of the second channel control 208). When the input signals to the NAND gate 344 are in the "low" state, indicating that the designated corresponding stages in the channel shift registers 300 and 302 connected thereto correspond or are identical, the NAND gate output signal 340 is in the "high" state and, assuming the digital latch 326 output signal 330 is in the "high" state, indicating that a repeatable, valid identification code is in the channel shift registers 300 or 302 connected thereto, the output signal 342 of the AND gate 338 is in the "high" state activating the digital latch 370 to provide a "low" signal 104 or 106 via the inverter 374.

The output signal 104 or 106 corresponding to first channel valid data signal 104 and the second channel valid data signal 106 are each connected to the data transfer clock 218, described before with respect to FIG. 6, the output signals 104 and 106 each disengaging the data transfer clock 218 in a "high" state of the output signal 104 or 106. Thus, the K exclusive OR gates, three of the exclusive OR gates 346, 348 and 350 being shown in FIG. 9, cooperate with the R pulse counter 312 repeatable data circuit, shown in FIG. 8, such that a "low" state of the digital latch output signal 372 indicates that a valid vehicle identification code of the proper format is contained in the channel shift registers 300 and 302. It should be noted that the K exclusive OR gates, three of the exclusive OR gates 346, 348 and 350 being shown in FIG. 9, are utilized to substantially assure that the data in the channel shift registers 300 and 302 connected thereto is in the form of a proper vehicle identification code and that the beginning of the vehicle identification code located in the channel shift registers 300 and 302 is, more particularly, located in the $I_1$ digital shift register stage thereof.

In this regard, it should be noted that, in a preferred form, the vehicle identification codes, utilized in cooperation with the vehicle identification and warning apparatus 10, are each constructed and organized to have a unique code word format wherein the first K stages of the code word format are identical to the last K of the code word format, each set of K stages of the code word format between the first K stages and the last K stages having, in a preferred form, a single stage dedicated to substantially assuring that the intervening sets of K stages of a code word format are not identical to the adjacent set of K stages of the code word format. The code word format, described above, is diagrammatically shown in FIG. 10 wherein K is equal to three (3) and there are three (3) sets of K stages of the code word format, for the purpose of illustrating the code word format which is preferably utilized to represent the vehicle identification codes in the vehicle identification and warning apparatus 10, described above. In this example; $I_1$, $I_2$ and $I_3$ represent the code data in the first set of K stages, $I_4$, $I_5$ and $I_6$ represent the code data $I_5$ and $I_6$, and the dedicated stage $I_4$ in the intervening set of K stages and $I_7$, $I_8$ and $I_9$ represent the code data in the last set of K stages. From the foregoing, it will be apparent to those skilled in the art that, if the $I_4$ stage was not a dedicated stage allotted to assure the intervening set of K stages are different than the adjacent sets of K stages, it would not be possible, in all instances, to determine a unique beginning and end of a particular code word, representing a vehicle identification code.

It should also be noted that, in addition to the unique code word format preferably used for the vehicle identification codes, the number of sets of K stages is, in a preferred form, an odd integer; that is K is equal to an odd integer to substantially avoid the possibility of creating an ambiguity in locating the correct beginning of the code word identifying the vehicle identification code, thereby producing a code length with an odd number of stages. Utilizing the code word format and the odd integer value of K, the beginning and the end of a code word format, representing a vehicle identification, can be uniquely detected by the K exclusive OR gates, three exclusive OR gates 346, 348 and 350 being shown in FIG. 9.

It should also be noted that the output signal 104 or 106 is connected to one of the inputs of the AND gate 304, as described before with respect to FIG. 8, the output signals 104 and 106 being utilized to disengage and render the channel shift registers 300 and 302 inoperative, in response to a determination that the data in the channel shift registers 300 is repeatable and represents a valid vehicle identification code. The shift registers 300 and 302 each remain in the inoperative or disengaged status until one of the inputs of an OR gate 376 receives a signal, the output signal of the OR gate 376 being connected to the digital latch 370 and utilized to reset the digital latch 370. It should be noted that the output signal 104 or 106 is connected to a portion of the speed-direction control 90 and the signal 106 deactuating the speed-direction control 90 and positioning the speed-direction control 90 in a deactuated stand-by status, as generally described before.

The first and the second channel controls 206 and 208 produce the output signals 104 and 106, indicating that a repeatable valid vehicle identification code has been clocked into the first and the second channel shift registers 300 and 302, the output signals 104 and 106 each being connected to the data transfer clock 218 for activating the transfer data clock, as diagrammatically shown more clearly in FIG. 12. The data transfer clock 218 generally includes: a NAND gate 380; an S-pulse counter 382; and a code length counter 384. The output signals 104 and 106 from the first channel control 206 and the second channel control 208, respectively, and the oscillator output signal 204 are each connected to the input of the NAND gate 380, the NAND gate 380 being constructed to provide an output signal 386 corresponding to the oscillator output signal 204 in response to the received signals 104 and 106.

The S-pulse counter 382 is, more particularly, constructed to provide the transfer clock pulse 101 in response to a predetermined number S input pulses thereto. The transfer clock pulse 101 is connected to the first and to the second channel shift registers 300 and 302, respectively, as diagrammatically shown in FIG. 11, in lieu of the input clock pulse 98 of the input data clock 216, described before. The transfer clock pulse 101 is also connected to the code length counter 384, the code length counter 384 being constructed to provide a single output pulse for every predetermined number of input pulses thereto and, more particularly, to provide an output pulse for every P input pulses thereto via the input transfer clock pulse 101 wherein P represents the number of binary stages required to encode the vehicle identification code in the code format, described before with respect to FIG. 10.

The code length counter output signal or, in other words, the transfer clock reset pulse signal 100 is also connected to the S-pulse counter 382, the pulse counter 382 receiving the transfer clock reset pulse signal 100 and being disengaged in response thereto, thereby disengaging the data transfer clock output signal 101 from the code length counter 384. The code length counter output signal 100 is also connected to the input of the OR gate 376, as described before with respect to FIG. 9, and thus produces the reset signal to the digital latch 370 via the OR gate 376, thereby allowing the first and the second channel shift registers 300 and 302 connected thereto to be engaged to receive the output signal 310 of the AND gate 306 (incoming data line) and to the data clock pulse 308, thereby activating the first and the second channel shift registers 300 and 302 connected thereto.

Thus, the data transfer clock 218 shifts P digital shift register stages of data simultaneously from the first channel shift register 300 and the second channel shift register 302 upon receiving the output signals 104 and 106, indicating that the first and the second channel shift registers 300 and 302, respectively, each contain a valid vehicle identification code the channel comparator output signal 122 being connected to the code length counter 384 and resetting the code length counter 384 in a "high" state thereof. In this event, the first and the second channel shift registers 300 and 302 are each again connected to receive the first receiver output signal 96 and the second receiver output signal 102, respectively, the input clock pulse 98 being also connected to the first and the second channel shift registers 300 and 302 and the data transfer clock 218 being disengaged.

During that portion of the operation of the identifier unit 42 when the transfer data clock 218 is activated and producing the transfer clock pulse 101, the channel comparator 210 is activated and compares the vehicle identification code in the first channel shift register 300 with the vehicle identification code in the second channel shift register 302. To provide yet another error detection which is utilized in the identifier unit 42 to further substantially reduce the possibility of a vehicle identification being erroneously received and utilized.

More particularly, when the data transfer clock 218 is activated via the first and the second channel valid data signals 104 and 106, the transfer clock pulse 101 is connected to the first and the second channel shift registers 300 and 302 in lieu of the input clock pulse 98 by utilizing the input data clock line or, more particularly, the AND gate output signal 308 and the transfer clock pulse 101 as inputs to an OR gate, since the input data clock 216 and the data transfer clock 218 each run or provide output signals at mutually exclusive times (the OR gate being shown in dashed-lines in FIG. 9 to indicate that the input data clock 216 and the transfer data clock 218 operate at mutually exclusive times and the output signals 308 and 391 are not received by the shift register 300 or 302 at the same time, and designated therein by the reference 388 having an output signal 391 also shown in dashed-lines). The output signal 391 of the OR gate 388 is connected directly to the inputs of the first and the second channel shift registers 300 and 302 in lieu of the AND gate output 308. Thus, the data transfer clock 218 is connected to the first and the second channel shift registers 300 and 302 and the data contained in the first binary stage of each channel shift register 300 and 302 is connected to the input of an exclusive OR gate 390, the signal from the second channel shift register 302 being designated in FIG. 11 by the reference 124 and the signal from the first channel shift register 300 being designated by the reference 123 in FIG. 11. The exclusive OR gate 390 is constructed such that the output signal 122 therefrom will be in the "low" state in response to received, identical signals 123 and 124 thereto, indicating identical data stored in corresponding digital shift register stages of the first channel shift register 300 and the second channel shift register 302.

The exclusive OR gate 390, more particularly, comprises the channel comparator 210, and each digital shift register stage of the first channel shift register 300 is compared to the designated corresponding digital shift register stage of the second channel shift register 302 via the output signals 123 and 124 being connected to the input of the exclusive OR gate 390, as the vehicle identification code contained in the first channel shift register 300 and the second channel shift register 302 is transferred therefrom to the buffer storage 94. If the data contained in designated corresponding digital shift register stages of the first and the second channel shift registers 300 and 302 is not identical, the channel comparator output signal 122 will be in the "high" stage, indicating that the designated corresponding digital shift register stages of the first and the second channel shift registers 300 and 302 contain different vehicle identification codes.

The channel comparator output signal 122 is connected to the input of the OR gate 376, as described before in respect to FIG. 9, the output of the OR gate 376 in response to a received comparator output signal 122 indicating that the data in the designated corresponding stages of the first and the second channel shift registers 300 and 302 are not identical, thereby re-engaging or reconnecting the first and the second channel shift registers 300 and 302 to the input data clock 216 and disengaging the data transfer clock 218 therefrom, in a manner described before with respect to the valid identification control 314, shown in FIG. 9. The comparator output signal 122 is also connected to a portion of the buffer storage 94 and is utilized to reset the register connected thereto in the buffer storage 94 in which the vehicle identification code from the first channel shift register 300 is in the process of being transferred via the transfer clock pulse 101 when the signal 122 was produced by the channel comparator 210.

As described before, the transfer clock reset pulse 100 from the data transfer clock 218 produced via the code length counter 384, indicating that identical vehicle identification codes are stored in the first and the second channel shift registers 300 and 302, is also connected to the speed-direction control 90, the data transfer clock reset pulse signal 100 also indicating that the vehicle identification code is repeatable and is utilized to activate the speed-direction control 90, the permanent storage controller 92 and the buffer storage 94. The speed-direction control 90, more particularly, includes an exclusive OR gate 400 having the first and the second channel valid data signals 104 and 106 connected to the inputs thereto via inverters 402 and 404, respectively, the exclusive OR gate 400 providing an output signal 406 in response to a first or second channel valid data signal 104 or 106, as shown more clearly in FIG. 13.

The inverters 402 and 404 are each constructed to invert the received first and second channel valid data signals 104 and 106 from a "high" state to a "low" state or from a "low" input state to a "high" input state, in a manner well known in the art. Thus, a first or second channel valid data signal 104 or 106 in the "low" state provides a "high" signal to the exclusive OR gate 400, the exclusive OR gate 400 providing the output signal 406 in response thereto. The exclusive OR output signal 406 is connected to the input of an AND gate 408, the other input of the AND gate 408 being the input clock pulse 98.

The AND gate 408 provides an output signal 410 in response to received input signals 98 and 406, the AND gate output signal 410 being connected to a T-stage counter 412. The AND gate 408 is more particularly constructed to pass the input clock pulse 98 and to connect the input clock pulse 98 to the T-stage counter 412 when simultaneously receiving the output signal 406 from the OR gate 400 and the input clock pulse 98. The output signal 410, corresponding to the input clock pulse 98 is connected to the input of the T-stage counter 412, the T-stage counter 412 being activated in response to the received signal 410 from the input data clock 216. The T-stage counter 412 has a predetermined number of output signal paths and, more particularly, is constructed to have T output signal paths, the T output signal paths being diagrammatically shown in FIG. 13 and designated therein by the reference 414. (Only three of the output signal paths 414 being shown in FIG. 13 for the purpose of clarity of description).

Figure 13:
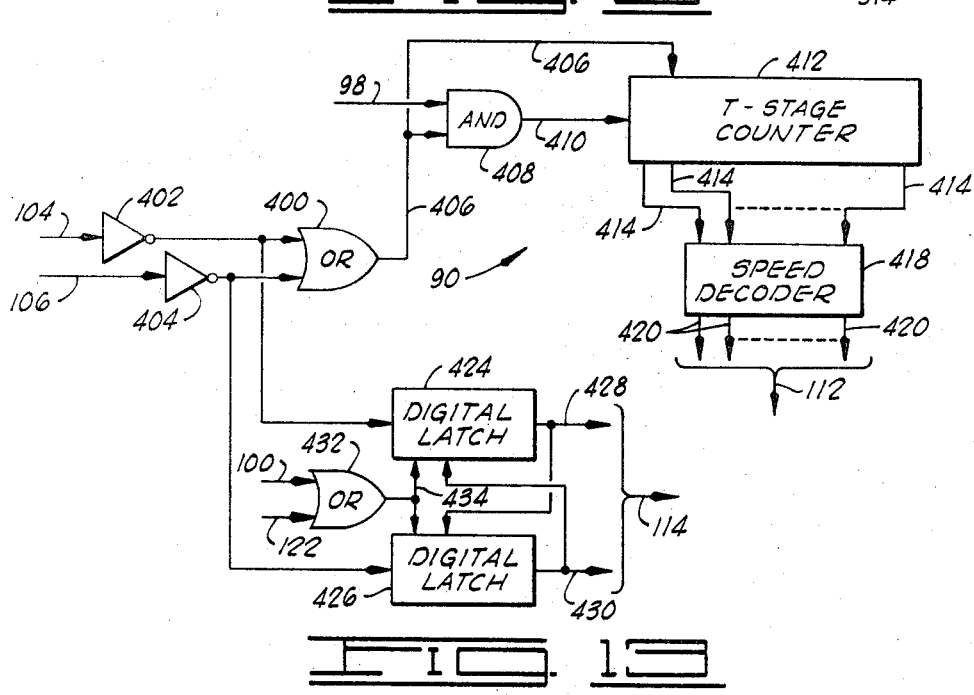
FIG. 13 is a diagrammatical view showing the speed-direction control of the identifier unit of FIGS. 1 and 6.

Each of the T signal paths 414 of the T-stage counter 412 is connected to a speed decoder 418, this speed decoder 418 being constructed to convert the state of the T-stage counter 412 into units representing excess speed, in a preferred form (three of the excess speed units being shown in FIG. 13 and designated therein by the reference 420). The excess speed units 420 from the speed decoder 418 comprise the speed-direction control output signal 112 which is connected to the buffer storage and is indicative of the determined excess speed of the identified vehicle, as generally described before.

Since the T-stage counter 412 has a predetermined, known number of stages T, the time period of the input clock pulse 98 is known, the distance between the two sets of identifier couplings 24 is known and the speed limit along the monitored, designated portion of the highway is known, the speed decoder 418 can be designed to be of the binary decoder type to correctly convert the T-stage counter output signals 414 to excess speed units 420 at any period of time after the AND gate 408 is activated via the output signal 406 and the input clock pulse 98 is connected to the input of the T-stage counter 412. Thus, when the second channel control 208 indicates that a valid vehicle identification code is contained therein, such indication being made by the absence of a signal 106, the output signal 406 of the exclusive OR gate 400 is returned to the "low" state and the T-stage counter 412 is deactivated, the correct excess speed being subsequently placed in the buffer storage 94 along with the corresponding vehicle identification code transferred to the buffer storage 94 from the first channel shift register 300 via the data transfer clock 218, as described before.

The speed-direction control 90 also includes a pair of digital latches 424 and 426, as diagrammatically shown in FIG. 13, each digital latch having an output signal 428 and 430, in one position thereof, respectively. The output signal 428 of the digital latch 424 being connected to the digital latch 426 in such a manner that the output signal 428 provides a reset signal for the digital latch 426, and the output signal 430 of the digital latch 426 being connected to the digital latch 424 such that the output signal 430 provides a reset signal for the digital latch 424. An OR gate 432 having input signals 100 and 122 is connected to each of the digital latches 424 and 426 and, more particularly, the output signal 434 of the OR gate 432 is connected to each of the digital latches 424 and 426.

The digital latches 424 and 426 are thus connected such that a first or second channel valid data signal 104 or 106 to the input of one of the digital latches 424 or 426 will render the other digital latch 424 or 426 inoperative until both of the digital latches 424 and 426 are reset by a signal on either the transfer clock reset pulse 100 or the channel data comparison signal 122 indicating that the transfer of data is complete or that the vehicle identification codes in the first and the second channel controls 206 and 208 are not identical. For example, if the digital latch 424 receives a signal via the inverter 402, indicating the first channel control 206 has been activated via receiving a first receiver output signal 96, the digital latch output signal 428 would be produced from the digital latch 424, the digital latch output signal 428 being transferred to the buffer storage 94 when the vehicle identification code is identified by the second channel control 208 and a determination is made that the vehicle identification code contained in the second channel control 208 represents a valid vehicle identification code. Since the location of the identifier couplings 24 is known, the output signal 428 of the digital latch 424 is indicative of a vehicle travelling in one direction and an output signal 430 of the digital latch 426 is indicative of a vehicle travelling in the opposite direction, the digital latches output signals 428 and 430 constituting the speed-direction control output signal 114 and being transferred to the buffer storage 94, as generally described before.

Figure 14:
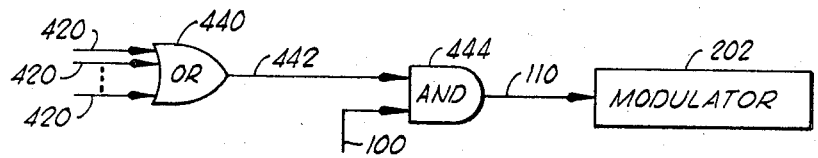
FIG. 14 is a diagrammatical view of a portion of the identifier unit of FIGS. 1 and 6, showing the portion thereof for providing the signal to activate the modulator thereby providing the warning signals.

The speed-direction control 90 is also constructed to produce the output signal 110 to activate the modulator 202 of the vehicle transmitter 80, as described before. As shown in FIG. 14, the speed-direction control 90, more particularly, includes an OR gate 440 having a predetermined number N inputs 420 connected thereto and providing an output signal 442 in response to an input signal 420 on any one of the N inputs thereto. Thus, the output signal 442 indicates that an excess speed has been determined by the speed-direction control 90, the output signal 442 being connected to the input of an AND gate 444. The transfer clock reset pulse 100 is also connected to the input of the AND gate 444, the AND gate 444 providing the output signal 110 in response to received input signals 442 and 100, indicating that an excess speed has been detected and the valid vehicle identification codes have been transferred to the buffer storage 94.

The AND gate output 110 activates the modulator 202 which amplitude modulates the transmitted signal at a predetermined frequency which is N times less than the frequency of the signal 204 from the oscillator 200, the modulator 202 being constructed to modulate the oscillator output signal 204 for a predetermined, controlled period of time and to subsequently be automatically deactivated.

In a preferred form, the identifier unit 42 is also constructed to provide a vehicle location indication, indicative that a predetermined vehicle has been identified, for various reasons, as generally described before. After the error identification control 86 has determined that the data clocked into the first channel control 206 and the data clocked into the second channel control 208 each represent valid vehicle identification codes, the data transfer clock 218 is activated to provide the transfer clock pulse 101 therefrom, as described before with respect to FIG. 12, the data transfer clock pulse 101 being connected to the input of the permanent shift registers located in a portion of the permanent storage 212 of the permanent storage controller 92, as diagrammatically shown in FIG. 15.

Figure 15:
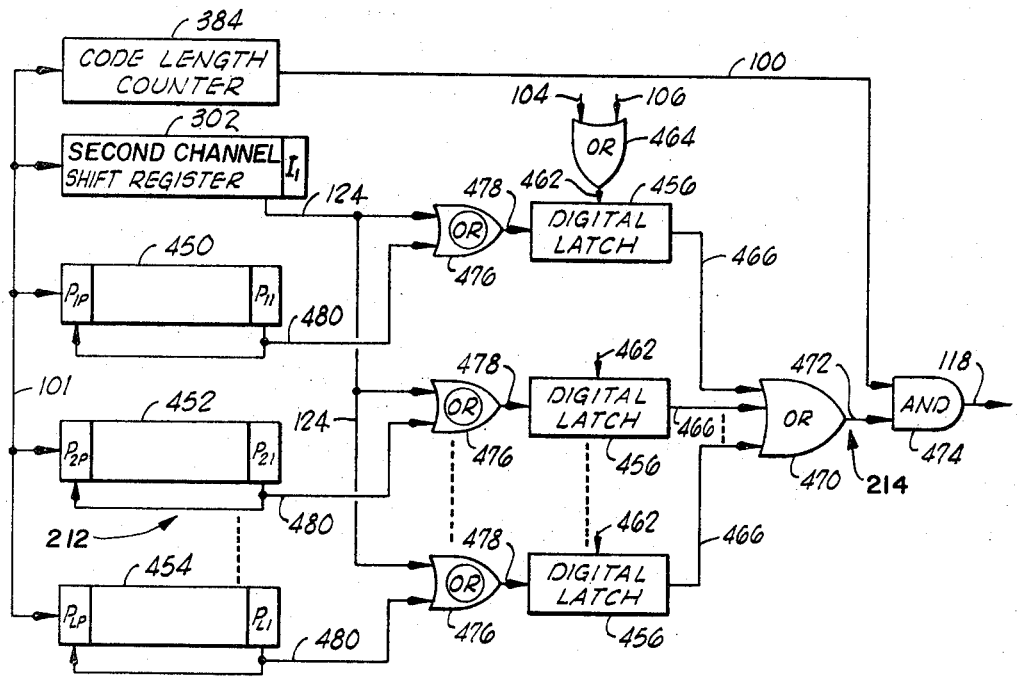
FIG. 15 is a diagrammatical view of the permanent storage controller of the identifier unit of FIGS. 1 and 6.

The permanent storage 212 includes a plurality of permanent shift registers, three of the permanent shift registers being shown in FIG. 15 and designated therein by the references 450, 452 and 454, each permanent shift register 450, 452 and 454 being constructed and connected to receive the transfer clock pulse 101. The transfer clock pulse 101 is also connected to the input of the second channel shift register 302 and to the input of the code length counter 384, as described before.

The storage comparator 214 includes a plurality of digital latches, three of the digital latches being shown in FIG. 15 and each being designated therein by the reference numeral 456. Each digital latch 456 is constructed to receive a reset signal 462 provided from an OR gate 464 in response to a received signal 104 or 106. Each digital latch 456 is constructed to provide an output signal 466, the digital latch output signals 466 being connected to the input of a predetermined number V input OR gate 470, wherein V represents the number of permanent shift registers located in the permanent storage controller 92 of the identifier unit 42. The OR gate 470 provides an output signal 472 in response to a received input signal 466 from any one of the digital latches 456, the OR gate output signal 472 being connected to the input of an AND gate 474. The transfer clock reset pulse 100 from the code length counter 384 is also connected to the input of the AND gate 474, and the AND gate 474 is constructed to provide the output signal 118 in response to received input signals 100 and 472.

The storage comparator 214 of the permanent storage controller 92 also includes a plurality of exclusive OR gates, each exclusive OR gate being designated by the reference 476 in FIG. 15. The exclusive OR gates 476 are each constructed to receive an output signal 480 from one of the permanent shift registers of the permanent storage 212 (three exclusive OR gates 476 being shown in FIG. 15 for the purpose of clarity of description). When the transfer clock pulse 101 is connected to the input of the second channel shift register 302, the reset signal 462 connected to each digital latch 456 of the storage comparator 214 is deactivated or low, thereby deactivating the digital latches 456 since the input signals 104 and 106 to the OR gate 464 are deactivated.

The output signal 466 of each of the digital latches 456 is in a "high" state when the reset signal 462 is deactivated and prior to the first data clock pulse being applied via the transfer clock pulse 101. In this position of the digital latches 456, the output signal 472 of the OR gate 470 is in a "high" state. Thus, if any one of the input lines to the OR gate 470 are in the "high" state, the output signal 472 is produced therefrom and connected to the AND gate 474. If the AND gate 474 is also receiving the signal 100, indicating that a complete vehicle identification code has been transferred to the buffer storage 94, the output signal 118 will be produced from the AND gate 474. The output signal 118 is connected to a portion of the buffer storage 94, as generally described before with respect to FIG. 6, and indicates that the vehicle identification code subsequently entered or clocked into the buffer storage 94 is identical to a vehicle identification code stored in one of the permanent shift registers of the permanent storage 212.

Referring to FIG. 15, for example, one of the exclusive OR gates 476 is connected to the first digital shift register stage output of the permanent shift register 450, the first digital shift register stage of the permanent shift register 450 being designated in FIG. 15 as $P_{11}$, and the digital shift register stage $I_1$ of the second channel shift register 302 provides the output signal 124 of the second channel shift register 302 connected to the input of the exclusive OR gate 476. As the data in each stage of the vehicle identification code is shifted into the stages $I_1$ and $P_{11}$ by the transfer clock pulse 101, either $I_1$ data is identical to the data in $P_{11}$ or they are different (identical refers to a "high" state) and, if the data in the $I_1$ digital shift register stage is identical to the data in the $P_{11}$ digital shift register stage for each of the P clock pulses supplied via the transfer clock pulse 101, the output signal 478 from the exclusive OR gate 476 remains in the "low" state and the output signal 466 of the digital latch 456 connected thereto remains in the initial "high" state whenever a signal 100 is present signifying that "P" data pulses, the number of binary stages in the code, have been transferred from the second channel shift register 302 to a buffer storage shift register in the buffer storage 94. If the data in the $I_1$ digital shift register stage is different with respect to the data in the $P_{11}$ digital shift register stage, an output signal 478 is produced from the exclusive OR gate 476 connected to that particular permanent shift register 450, and the output signal 466 of the digital latch 456 connected thereto is changed from the "high" state to the "low" state. The AND gate 474, providing the output signal 118 therefrom, is connected to the buffer storage 94, the signal 118 being in a "low" state to indicate that the vehicle code transferred to the buffer storage 94 does not correspond to any one of the vehicle identification codes stored in the permanent shift registers of the permanent storage 212.

It should also be noted that the first and the last digital shift register stage of each of the permanent shift registers of the permanent storage 212 are connected, thereby placing the vehicle identification codes back into each permanent shift register or, in other words, returning each permanent shift register to its original state eace time P data transfer clock pulses are applied to the permanent shift registers. In this manner, the data placed in the permanent shift registers of the permanent storage 212 are retained therein until a new vehicle identification code is placed therein via the communicating link 32, as generally mentioned before.

As mentioned before, with respect to the description of the error identification control 86, the synchronization controller 88, the speed-direction control 90 and the permanent storage control 92, the information available via the identifier unit 42 is initially transferred to the buffer storage 94 via the signals 101, 123, 122, 118, 112, 114, and 100 and new vehicle identification code data is transferred to the permanent storage 212 from the buffer storage 94 via the connection 120 therebetween. The signal connections 101 and 123 are utilized to clock vehicle identification codes into a particular shift register of the buffer storage 94 which is empty. To substantially assure that a shift register will be available in the buffer storage upon request, the number of shift registers contained in the buffer storage 94 of the identifier unit 42 is determined considering the frequency in which the district processor 20 or the central processor 22 may request that the data contained in a storage register of the buffer storage 94 be transferred to the district processor 20 or the central processor 22 and the traffic density at the location of the particular identifier unit 42, these two considerations being the salient design considerations in selecting or determining the number of shift registers to be utilized in a particular buffer storage 94. For example, if a traffic density of 200 vehicles per hour is expected at the particular location of the identifier unit 42 and a violation rate of 10 percent is expected, no storage buffers would be required during those periods of time when no violations are occuring, consequently an average buffer storage requirement of 20 vehicles per hour would be expected, unless the district processor 20 or the central processor 22 requested data from the shift registers in the buffer storage 94 at a frequency in excess of one per hour. Assuming that 60 identifier units, for example, were connected to a single district processor 20 via a standard 600 bits per second telephone line, each identifier unit 42 could be allocated 10 bits per second, and if a 60 stage buffer storage register was utilized to store vehicle identification codes of 48 stages and 12 stages were utilized to store speed, location and direction of travel information, then, on the average, a shift register in the buffer storage 94 would be emptied every 6 seconds. Thus, at a request rate of 20 per hour, a single shift register in the buffer storage 94 would be sufficient. Although the foregoing example is realistic in the vehicle density rates, the number of identifier units per central processor and the violation rates, more than one digital shift register in the buffer storage 94 would be desirable in order to handle peak traffic density rates and unusually high traffic violation rates, for example.

Figure 16:
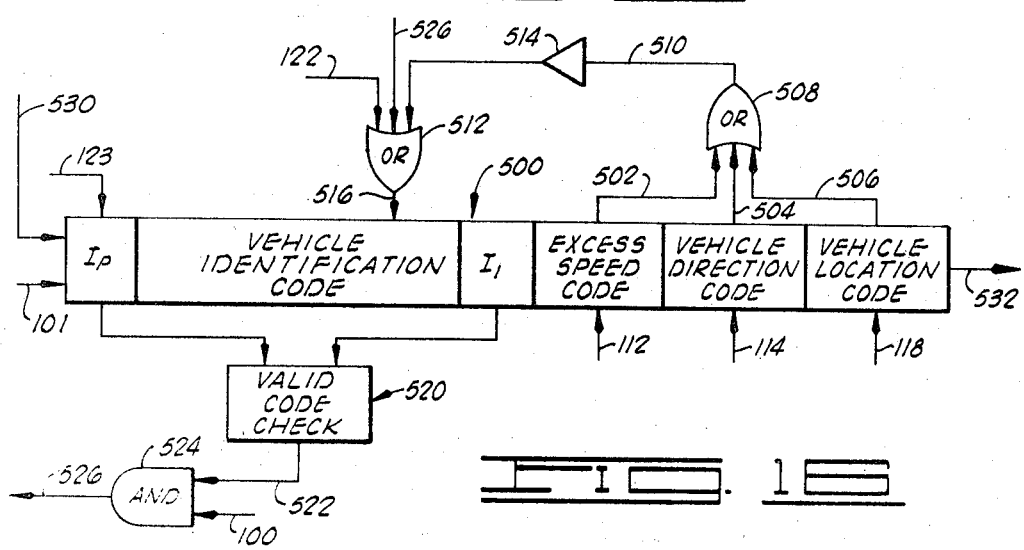
FIG. 16 is a diagrammatical view showing a portion of the buffer storage of the identifier unit of FIGS. 1 and 6.

When a vehicle identification code is transferred to one of the digital shift registers in the buffer storage 94 and a channel comparator output signal 122 is not present, thereby indicating that the vehicle identification codes in the first and the second channel controls 206 and 208 are identical, the vehile identification code is then entered into one of the empty buffer storage shift registers of the buffer storage 94, one buffer storage shift register being diagrammatically shown in FIG. 16 and designated therein by the reference 500. The vehicle identification code data transferred from the first channel control 206 to the buffer storage 94 via the signal 123 is clocked into the first P stages of the buffer signal shift register 500 via the transfer clock signal 101, the excess vehicle speed data represented by the signal 112, the vehicle direction of travel data represented by the signal 114 and the vehicle location data on the signal 118 are each clocked directly into the buffer storage locations specially allocated for this information. The data lines 502, 504 and 506 are each connected to the input of an OR gate 508 having an output signal 510 connected to the input of an OR gate 512. As shown in FIG. 16, an inverter 514 is interposed between the OR gate 508 and the OR gate 512. Thus, if the data lines 502, 504 and 506 are each in the "low" state, the OR gate 508 will provide a buffer register reset pulse 516, the buffer register reset pulse 516 being the output of the OR gate 512, and the shift register buffer 500 will remain empty. It should also be noted that, if the data clocked into the shift register buffer 500 cannot be detected by a valid code check network 520 to represent a valid vehicle identification code, a signal 522 is produced from a valid code check network 520. The output signal 522 of the valid code check 520 is connected to one of the inputs of an AND gate 524, the other input of the AND gate 524 being connected to receive the transfer clock reset pulse 100. The AND gate 524 is constructed to provide an output signal 526 in response to simultaneously received input signals 522 and 100, the output signal 526 being connected to one of the inputs of the OR gate 512, as shown in FIG. 16.

Thus, if at the time data is clocked into the buffer shift register 500, a valid vehicle identification code cannot be detected via the valid code check network 520, the valid code check output signal 522 is produced at the input of the AND gate 524, thereby producing the output signal 526 to the OR gate 512 causing the reset signal 516 to be connected to the buffer shift register 500 to reset to zero the buffer shift register stages. The valid code check network 520, in one form, is constructed similar to the valid identification control 314, in a manner assuring the data clocked into the first shift register stages is identical to the data clocked from the last digital shift register stages as described before with respect to FIG. 9.

In the event the buffer shift registers in the buffer storage 94 are each full; that is each buffer shift register contains data, and a request is sent from the district processor 20 or the central processor 22 to transfer data from the buffer storage shift registers, the data contained therein is transferred to the available transmission or storage media such as standard telephone lines or magnetic tapes, for example, in the case of a storage media, by applying a data clock pulse 530 to the buffer shift register 500, as diagrammatically shown in FIG. 16, and clocking the data out on a communication link 532. In those instances where parallel data transfer is utilized the data clock pulse 530 would be in the nature of a data strobe and, in this instance, a communication link similar to the communication link 532 would be connected to each of the buffer shift register stages, for example.

It should be noted that, if the number of stages utilized to identify vehicles and produce the unique code format is 48, then the probability that a random error would occur in identical stages of the first and the second channel shift registers 300 and 302 would be less than one chance in two thousand, for example. Furthermore, the error-free technique described in conjunction with FIG. 8 wherein the R-pulse counter 312 required that the data pulses be repeatable, further reduces the probability of erroneous data being accepted in either the first or the second channel shift registers 300 or 302, to approximately $(1/P)^2$ wherein $R = 2P$. In this last-mentioned instance, the complete probability that an erroneous vehicle signal be produced in the buffer storage 94 by the influence of spurious noise is reduced by $(1/P)^5$ over that probability associated with the signal-to-noise ratio of the data entering receivers 82 and 84. For example, if the signal-to-noise condition entering one of the receivers 82 and 84 was two-to-one, generally considered in the art to be a marginal condition to those skilled in the art, and, if P is determined to be equal to 48, the probability that a random error will go undetected is approximately once in $10^{18}$ error detection cycles ($t \times 48 = 240$ data pulses equals one error detection cycle). Assuming data pulses are being received at a rate of 25 KHz, then the expected number of errors is one error each 30 trillion years; in contrast to a simple parity error detection scheme wherein the corresponding error rate for the same signal-to-noise conditions would be approximately 98 million errors per year, for example (the term "simple parity" being utilized to indicate that the number of non-zero data pulses are always made to be an even number and in the event an odd number of data pulses are detected in the channel shift register an invalid code is declared).

It should again be emphasized that, although the various operations of the assembles and components of the present invention have been particularly described with respect to one particular operational embodiment, the various components and assemblies are also considered to be useful in various other systems, singularly or in various combinations. The communication apparatus described herein provides an economical and efficient means for monitoring and controlling traffic, and various additional assemblies can be added or various data derived, such as a traffic count along a particularly monitored roadway, a continuous check of particular classes of vehicles, for example.

Changes may be made in the construction and the arrangement of the parts or the elements of the embodiments disclosed herein without departing from the spirit and the scope of the invention as defined in the following claims.

What is claimed is:

1. A communication apparatus for providing communication between a first object and a second object, comprising:
   means in the first object generating and transmitting a transmit signal;
   means in the second object receiving the transmit signal and providing an emitted signal coherently related to the transmit signal in response to the received transmit signal, comprising:
   a receiver receiving the transmit signal and providing an output signal having a frequency coherently related to the frequency of the received transmit signal;
   an identification encoder connected to the receiver and receiving the receiver output signal, the identification encoder having a predetermined code and providing an output signal indicative of the predetermined code in response to the receiver output signal;
   a signal controller receiving the receiver output signal and the identification encoder output signal and encoding the predetermined code in the received receiver output signal providing an encoded emitted signal having a frequency coherently related to the frequency of the transmit signal and encoded with the predetermined code; and
   means in the first object receiving the emitted signal.

2. The communication apparatus of claim 1 wherein the signal controller includes:
   a frequency translator receiving the receiver output signal and providing a frequency translator output signal having a predetermined set of cycles for each predetermined set of cycles of the received receiver output signal; and
   wherein the identification encoder is further defined as receiving the frequency translator output signal and providing the identification encoder output signal indicative of the predetermined code in response to the received frequency translator output signal; and
   wherein the signal controller is further defined to include a portion receiving the frequency translator output signal and the identification encoder output signal, the signal controller encoding the predetermined code in the received frequency translator output signal providing the emitted signal in response to the received frequency translator output signal and the received identification encoder output signal.

3. The communication apparatus of claim 1 wherein the signal controller includes:
   a frequency translator receiving the receiver output signal and providing a frequency translator output signal having a single cycle for each predetermined "N" cycles of the received receiver output signal; and
   a modulator receiving the frequency translator output signal and the identification encoder output signal and encoding the predetermined code in the frequency translator output signal providing the emitted signal having a frequency coherently related to the frequency of the transmit signal encoded with the predetermined code; and
   wherein the means in the first object receiving the emitted signal includes a portion decoding the predetermined code encoded in the received emitted signal.

4. The communication apparatus of claim 1 defined further to include:

coupling means coupling the transmit signal to the receiver in the second object and coupling the emitted signal to the means in the first object receiving the emitted signal in a communicating proximity position of the receiver in the vehicle unit and the coupling means.

5. The communication apparatus of claim 1 wherein the signal controller is defined further to include:

means receiving the receiver output signal and providing a frequency translated output signal in response thereto; and a modulator receiving the frequency translated output signal and the identification encoder output signal indicative of the predetermined code, the signal indicative of the predetermined code modulating the frequency translator output signal encoding the predetermined code therein, the modulator providing a modulator output signal corresponding to the emitted signal encoded with the predetermined code.

6. A communication apparatus for providing communication between a first object and a second object, comprising:

means in the first object generating and transmitting a transmit signal;

means in the second object receiving the transmit signal and providing an emitted signal coherently related to the transmit signal in response to the received transmit signal, the means providing the emitted signal including: receiver means in the second object receiving the transmit signal and providing a receiver output signal in response thereto;

frequency translator means receiving the receiver output signal and providing a frequency translator output signal having a single cycle for each predetermined N cycles of the received receiver output signal;

pulse counter means receiving the frequency translator output signal and providing a pulse counter output signal in response thereto having a single cycle for each predetermined M cycles of the frequency translator output signal;

identification encoder means having a predetermined code stored therein and providing an identification encoder output signal indicative of the predetermined code, the identification encoder means receiving the pulse counter output signal and being operated via the received pulse counter output signal at the frequency of the transmit signal translated by a predetermined amount MN and providing the identification encoder output signal in response thereto; and modulator means receiving the frequency translator output signal and the identification encoder output signal and providing the emitted signal having a frequency corresponding to the frequency of the transmit signal translated by N and modulated via the identification encoder output signal in response to the received frequency translator output signal and the received identification encoder output signal, the emitted signal having encoded therein the predetermined code; and means in the first object receiving the emitted signal, having a portion decoding the predetermined code encoded in the received emitted signal.

7. The communication apparatus of claim 6 wherein the identification encoder means includes shift register means having P stages and having the predetermined code stored therein, the last stage of the shift register means connected to the first stage of the shift register means for providing a cyclic identification encoder output signal repeated every (1/NMP) cycles of the transmit signal.

8. The communication apparatus of claim 7 wherein the shift register means includes: a first shift register; and a second shift register, the first and the second shift registers each having P stages and the predetermined code stored therein, the last stage of each being connected to the first stage thereof for providing the cyclic identification encoder output signal; and wherein the identification encoder means includes: gate means receiving the identification encoder output signals from the first and the second shift registers and providing an output signal when the received signals indicate a malfunction of any one stage of the first and second shift registers; and wherein the first and the second shift registers each receive the output signal of the gate means, the first and the second shift registers each being disengaged in response to the received output signal of the gate means.

9. The communication apparatus of claim 6 wherein the means in the first object receiving the emitted signal includes:

channel shift register means receiving the encoded emitted signal in one position thereof; and input clock means receiving the transmit signal and the emitted signal and translating the transmit signal to be synchronized with the emitted signal providing an input clock pulse in response to the received signals, the input clock pulse connected to the digital shift register means for clocking the encoded emitted signal into the digital shift register means when connected thereto.

10. The communication apparatus of claim 9 wherein the input data clock in the first object is defined further to include:

N-digital counter means receiving the transmit signal and providing an output signal having a single cycle for each predetermined N cycles of the received transmit signal, thereby translating the transmit signal by an amount N corresponding to the frequency translation of the frequency translator means;

a pair of M-digital counters receiving the incoming encoded emitted signal and being engaged in response thereto, and receiving the N-digital counter output signal and providing a predetermined number M output signals in response thereto;

M-input gate means connected to each M-digital counter, each M-input gate means receiving the output signals of the M-digital counter connected thereto and providing an input clock pulse connected to the channel shift register means to clock the incoming emitted signal therein (1/M) as wide as the code pulse of the encoded emitted signal connected to the channel shift register means and appearing at the digital shift register means after (M/2) pulses are provided thereto via the incoming encoded emitted signal; and inverter means interposed between one of the M-digital counters and the incoming encoded emitted signal, one M-digital counter and the M-input gate means connected thereto providing the input clock pulse in response to a data pulse on the incoming encoded emitted signal and the one other M-digital counter and the M-input gate means connected thereto providing the input clock pulse in response to a no-data pulse on the incoming encoded emitted signal.

11. The communication apparatus of claim 10 defined further to include:
   gate means interposed between the input data clock means and channel shift register means receiving the input clock pulse from each M-input gate means and providing the input clock pulse therefrom when receiving the input clock pulse from one of the M-input gate means.

12. A communication apparatus for providing communication between a first object and a second object, comprising:
   means in the first object generating and transmitting a transmit signal;
   means in the second object receiving the transmit signal and providing an emitted signal coherently related to the transmit signal in response to the received transmit signal;
   means in the first object receiving the emitted signal;
   means in the first object generating and transmitting a predetermined length amplitude modulation signal; and
   means in the second object receiving the modulation signal and providing an output indication in response thereto.

13. The communication apparatus of claim 12 wherein the means in the second object receiving the modulation signal includes:
   a detector having a minimum and a maximum output signal, receiving the modulation signal and providing a maximum output signal in response to a received modulation signal;
   an L-digital counter receiving the modulation signal and providing an output pulse signal in response to a predetermined number of L input pulses thereto, a portion of the L-digital counter receiving the detector output signal and being reset in response to a received minimum detector output signal;
   an M-digital counter receiving the modulation signal and providing an output pulse signal in response to a predetermined number of M input pulses thereto, the predetermined number M being less than the predetermined number L, a portion of the M-digital counter receiving the detector output signal and being reset in response to a received minimum detector output signal;
   a Q-digital counter receiving the output pulse signal from the L-digital counter and providing an output signal in response to a predetermined number Q input pulses thereto, the Q-digital counter receiving the output pulse signal from the M-digital counter and being reset thereby, the Q-digital counter corresponding with the L-digital counter, the M-digital counter and the detector to provide an output signal therefrom in response to a modulation signal modulated sufficient to produce L and insufficient to produce M pulses and having a pulse interval of a sufficient length to produce a minimum detector output signal; and
   means receiving Q-digital counter output signal and providing the output indication in response thereto.

14. A communication apparatus for providing communication between a first object and a second object, comprising:
   means in the first object generating and transmitting a transmit signal;
   means in the second object receiving the transmit signal and providing an emitted signal coherently related to the transmit signal in response to the received transmit signal, comprising:
      a receiver receiving the transmit signal and providing an output signal in response to the received transmit signal;
      an identification encoder having a predetermined code and providing a cyclic output signal repetitively indicative of the predetermined code; and
      a signal controller receiving the receiver output signal and the identification encoder output signal and repetitively encoding the predetermined code in the received receiver output signal providing the emitted signal having a frequency coherently related to the frequency of the transmit signal and having the predetermined code repetitively encoded therein; and
   means in the first object receiving the emitted signal having a portion determining the predetermined code encoded in the received emitted signal to be identically repeatable a predetermined number of times and providing a valid data output signal responsive to such determination.

15. A communication apparatus for providing communication between a first object and a second object, comprising:
   means in the first object generating and transmitting the transmit signal;
   means in the second object receiving the transmit signal and providing an emitted signal coherently related to the transmit signal in response to the received transmit signal, the means providing the emitted signal including:
      means having a predetermined code stored therein providing an output signal indicative of the predetermined code, the output signal being cyclic and the emitted signal having a predetermined code repetitively encoded therein;
      means receiving the transmit signal providing the frequency translated output signal in response thereto; and
      a modulator receiving the frequency translated output signal and the output signal indicative of the predetermined code, the signal indicative of the predetermined code modulating the frequency translated output signal encoding the predetermined code therein providing a modulator output signal corresponding to the emitted signal cyclicly encoded with the predetermined code; and
   means in the first object receiving the emitted signal, including:
      means receiving the emitted signal and determining the predetermined code of the received encoded emitted signal to be identically repeatable a predetermined number of times and providing a valid data output signal responsive to such determination, including:
  channel shift register means receiving the encoded emitted signal and having a predetermined number of digital shift register stages receiving the predetermined code therein between the first and the last digital shift register stage thereof;
  a synchronization control connected to the channel shift register means providing an input clock pulse clocking the encoded emitted signal into the first digital shift register range of the channel shift register means when connected thereto;
  gate means receiving the encoded data clocked into the first digital shift register stage and the data clock from the last digital shift register stage providing an output signal indication responsive to a difference in the received signals; and
  means receiving the output indication of the gate means and counting the number of input signal pulses of the encoded data clocked into the first digital shift register stage identical to the input signal pulses clocked from the last digital shift register stage determining the repeatability of the data encoded in the received incoming signal.

16. The communication apparatus of claim 15 wherein the means in the first object determining the predetermined code to be repeatable is defined further to include:
  an R-pulse counter receiving the input clock pulse and providing an output signal indicative of a predetermined number R code pulses, comprising the predetermined code, clocked into the channel shift register means and receiving the gate means output signal and being reset thereby; and
  means receiving the R-pulse counter output signal and disengaging the channel shift register means from the incoming encoded emitted signal.

17. The communication apparatus of claim 16 defined further to include:
  means determining the predetermined code clocked into the channel shift register means to be a valid predetermined code and providing an output signal responsive to such determination; and
  means receiving the R-pulse counter output signal and the output signal from the means determining the predetermined code clocked into the channel shift register means to be a valid predetermined code and disengaging the channel shift register means from the incoming encoded emitted signal.

18. A communication apparatus, comprising:
  an identifier unit having a portion generating and transmitting a transmit signal, and a portion receiving predetermined signals;
  a vehicle unit receiving the transmit signal when coupled thereto, having a portion emitting an emitted signal coherently related to the transmit signal, the emitted signal being received by the receiving portion of the identifier means when coupled thereto, the vehicle unit including:
    a receiver receiving the transmit signal and providing an output signal having a frequency coherently related to the frequency of the received transmit signal;
    an identification encoder connected to the receiver and receiving the receiver output signal, the identification encoder having a predetermined code and providing an output signal indicative of the predetermined code in response to the receiver output signal; and
    a signal controller receiving the receiver output signal and the identification encoder output signal and encoding the predetermined code in the received receiver output signal providing an encoded emitted signal having a frequency coherently related to the frequency of the transmit signal and encoded with the predetermined code; and
  coupling means coupling the transmit signal to the vehicle unit and coupling the emitted signal to the identifier unit in a communicating proximity position of the vehicle unit and the coupling means.

19. A communication apparatus, comprising:
  an identifier unit having a portion generating and transmitting a transmit signal, and a portion receiving predetermined signals;
  a vehicle unit receiving the transmit signal when coupled thereto, having a portion emitting an emitted signal coherently related to the transmit signal, the emitted signal being received by the receiving portion of the identifier means when coupled thereto, the vehicle unit including:
    a receiver receiving the transmit signal and providing an output signal corresponding to the received transmit signal;
    an identification encoder connected to the receiver and receiving the receiver output signal, the identification encoder having a predetermined code and providing an output signal indicative of the predetermined code in response to the receiver output signal; and
    a signal controller receiving the receiver output signal and the identification encoder output signal and encoding the predetermined code in the received receiver output signal providing an encoded emitted signal having a frequency coherently related to the frequency of the transmit signal and encoded with the predetermined code; and
  coupling means having one portion disposed to couple the transmit signal to the vehicle unit and the emitted signal to the identifier unit at a first position and one other portion disposed to couple the transmit signal to the vehicle unit and the emitted signal to the identifier unit at a second position, the identifier unit thereby receiving a first-received emitted signal when the vehicle unit is in communicating proximity with the coupling means in the first position and receiving a second-received emitted signal when the vehicle unit is in communicating proximity with the coupling means in the second position, the first and the second positions being spaced a predetermined known distance apart.

20. The communication apparatus of claim 19 wherein the vehicle unit signal controller is defined further to include:
  frequency translator means receiving the receiver output signal and providing a frequency translator output signal having a single cycle for each predetermined "N" cycles of the received receiver output signal;

pulse counter means receiving the frequency translator output signal and providing a pulse counter output signal in response thereto, having a single cycle for each predetermined "M" cycles of the frequency translator output signal; and modulator means receiving the frequency translator output signal and the identification encoder output signal and providing the emitted signal in response thereto, the emitted signal having encoded therein the predetermined code.

21. A communication apparatus, comprising:

an identifier unit having a portion generating and transmitting a transmit signal, and a portion receiving predetermined signals;

a vehicle unit receiving the transmit signal when coupled thereto having a portion emitting an emitted signal coherently related to the transmit signal, the emitted signal being received by the receiving portion of the identifier unit when coupled thereto, the vehicle unit including:

a receiver receiving the transmit signal and providing a receiver output signal in response thereto;

a frequency translator receiving a receiver output signal and providing a frequency translator output signal having a single cycle for each predetermined N cycles of the received receiver output signal;

a pulse counter receiving the frequency translator output signal and providing a pulse counter output signal in response thereto having a single cycle for each M cycles of the frequency translator output signal;

an identification encoder receiving the pulse counter output signal, having a predetermined code stored therein and providing a cyclic identification encoder output signal indicative of the predetermined code; and a modulator receiving the frequency translator output signal and the identification encoder output signal and providing the emitted signal in response thereto, the emitted signal having encoded therein the predetermined code;

coupling means coupling the transmit signal to the vehicle unit and coupling the emitted signal to the identifier unit in a communication proximity position of the vehicle unit and the coupling means, the coupling means including one portion disposed to couple the transmit signal to the vehicle unit and the emitted signal to the identifier unit at a first position and one other portion disposed to couple the transmit signal to the vehicle unit and the emitted signal to the identifier unit at a second position, the identifier unit thereby receiving a first-received emitted signal when the vehicle unit is in communicating proximity with the coupling means in the first position and receiving a second-received emitted signal when the vehicle unit is in communicating proximity with the coupling means in the second position, the first and the second positions being spaced a predetermined known distance apart;

first channel shift register means in the identifier unit receiving the first-received emitted signal and having a predetermined number of digital shift register stages receiving the predetermined code therein between the first and the last digital shift register stage thereof;

second channel shift register means in the identifier unit receiving the second-received encoded emitted signal and having a predetermined number of digital shift register stages receiving the predetermined code therein between the first and the last digital shift register stage thereof;

a synchronization control connected to the first channel shift register means in one position thereof providing an input clock pulse clocking the first-received encoded emitted signal into the first digital shift register stage thereof when connected to the first channel shift register, and connected to the second channel shift register, in one position thereof, providing an input clock pulse clocking the second-received encoded emitted signal into the first digital shift register stage thereof when connected to the second channel shift register means;

gate means receiving the encoded data clocked into the first digital shift register stage and the data clocked from the last digital shift register stage of the first channel shift register means and providing an output signal indication responsive to a difference in the received signals;

means in the identifier unit receiving the output signal indication of the first-mentioned gate means and counting the number of input signal pulses of encoded data clocked into the first digital shift register stage of the first channel shift register means identical to the input signal pulses clocked from the last digital shift register stage of the first channel shift register means determining the repeatability of the data encoded in the first-received encoded signal;

gate means receiving the encoded data clocked into the first digital shift register stage and the data clocked from the last digital shift register stage of the second channel shift register means and providing an output signal indication responsive to a difference in the received signals; and means in the identifier unit receiving the output signal indication of the last-mentioned gate means and counting the number of input signal pulses of encoded data clocked into the first digital shift register stage of the second channel shift register means identical to the input signal pulses of encoded data clocked from the last digital shift register stage of the second channel shift register means determining the repeatability of the data encoded in the second-received encoded signal.

22. The communication apparatus of claim 21 wherein the means receiving the output signal indication of the first-mentioned gate means is defined further to include:

an R-pulse counter means receiving the input clock pulse and providing an output signal indicative of a predetermined number R code pulses clocked into the first channel shift register means, and receiving the output signal indication of the first-mentioned gate means and being reset thereby; and wherein the means receiving the output signal indication of the second-mentioned gate means is defined further to include:
an R-pulse counter means receiving the input clock pulse and providing an output signal indicative of a predetermined number R code pulses clocked into the second channel shift register means and receiving the output signal indication of the second-mentioned gate means and being reset thereby.

23. The communication apparatus of claim 21 wherein the synchronization control is defined further to include:
input data clock means receiving the first-received and the second-received incoming emitted signals and providing the input clock pulse for clocking the first-received encoded emitted signal into the first channel shift register means and clocking the second-received encoded emitted signal into the second channel shift register means when connected thereto, comprising:
N-digital counter means receiving the transmit signal and providing an output signal having a single cycle for each predetermined N cycles of the received transmit signal, thereby translating the transmit signal by an amount N corresponding to the frequency translation of the frequency translator means;
a pair of M-digital counters receiving the incoming encoded emitted signal and being engaged in response thereto, and receiving the N-digital counter output signal and providing a predetermined number N output signals in response thereto;
a pair of M-input gate means, each M-input gate means connected to one M-digital counter and receiving the output signal of the M-digital counter connected thereto, each M-input gate means providing the input clock pulse (1/M) as wide as the code pulse of the encoded emitted signal connected to one of the first and the second channel shift register means and appearing at one of the first and the second channel shift register means after (M/2) pulses are provided thereto via the incoming encoded emitted signal; and
inverter means interposed between one of the M-digital counters and the incoming encoded emitted signal, one M-digital counter and the M-input gate means connected thereto providing the input clock pulse in response to a data pulse on the incoming encoded emitted signal and the one other M-digital counter and M-input gate means connected thereto providing the input clock pulse in response to a no-data pulse on the incoming encoded emitted signal; and
gate means receiving the input clock pulses from each M-input gate means and providing the input clock pulse therefrom when receiving the input clock pulse from one of the M-input gate means, the input clock pulse provided via this last-mentioned gate means being connected to the first channel shift register means and the second channel shift register means for clocking the first-received encoded emitted signal into the first channel shift register means and clocking the second-received encoded emitted signal into the second channel shift register means.

24. The communication apparatus of claim 23 defined further to include:
means determining the code clocked into the first channel shift register means to be a valid predetermined code and receiving the R-pulse counter output signal indicative of a predetermined number R code pulses clocked into the first channel shift register means and providing a first channel valid data signal in response to the received signals; and
means determining the predetermined code clocked into the second channel shift register means to be a valid predetermined code and receiving the R-pulse counter output signal indicative of a predetermined number R code pulses clocked into the second channel shift register means and providing a second channel valid data signal in response to the received signals.

25. The communication apparatus of claim 24 wherein the synchronization means is defined further to include:
data transfer clock means providing a transfer clock pulse for transferring code data from the first and the second channel shift register means, in one position, and a transfer reset pulse, in one other position, comprising:
NAND gate receiving the first and the second channel valid data signal and the transmit signal, providing an output signal corresponding to the transmit signal in response to one of the received first and second channel valid data signals;
S-pulse counter receiving the output signal of the NAND gate and providing a transfer clock pulse in response to a predetermined number of input pulses thereto, the transfer clock pulse being connected to the first and the second channel shift register means; and
code length counter means receiving the transfer clock pulse and providing a transfer reset pulse in response to a predetermined number of input pulses thereto corresponding to the length of the predetermined code to be transferred from the first and the second channel shift register means, the transfer reset pulse being connected to and resetting the S-pulse counter; and
channel comparator means receiving and comparing the predetermined codes from the first and the second channel shift register means and providing a channel data comparison signal in response to identical code data in the first and the second channel shift register means.

26. The communication apparatus of claim 25 defined further to include:
speed-direction control means receiving the first channel valid data signal and the second channel valid data signal and having a portion providing an output signal indicative of the elapsed time therebetween, and a portion receiving the elapsed time output signal and providing an output signal indicative of excess speed between the first position and the second position.

27. The communication apparatus of cliam 26 wherein the speed-direction control means is defined further to include:

inverter means receiving the first and the second channel valid data signals and providing inverted output signals therefrom;

OR gate means receiving the inverted signals from the inverter means and providing an output in response to one received signal;

AND gate means receiving the input clock pulse and the OR gate means output signal corresponding to the input clock pulse, and providing an output signal in response to the received signals;

T-stage counter means receiving the AND gate means output signal and being activated thereby, having T-output signal paths and providing output signals via the T-output signal paths in an activated position thereof, the T-stage counter means receiving the OR gate output signal and being reset thereby, the T-stage counter means being thereby activated in response to the first channel valid data signal and being subsequently reset in response to the second channel valid data signal; and speed decoder means receiving the output signals from the T-stage counter means and providing output signals corresponding excess speed units.

28. The communication apparatus of claim 26 wherein the speed-direction control means is defined further to include:

inverter means receiving the first and the second channel valid data signals and providing inverted output signals therefrom;

digital latch means receiving the output signals from the inverter means, providing one output signal in response to a first received first channel valid data signal and one other output signal in response to a first received second channel valid data signal, the output signals being indicative of the direction of travel of the vehicle unit coupled via the coupling means in the first and the second position; and means to reset the digital latch means.

29. The communication apparatus of claim 25 defined further to include:

permanent storage means having a plurality of predetermined codes permanently stored therein;

storage comparator means receiving and comparing the predetermined code encoded in the emitted signal and the permanently stored codes, the storage comparator means providing a permanent storage comparison signal in response to a comparison of the predetermined code encoded in the emitted signal with one of the permanently stored codes; and buffer storage means receiving the transfer clock pulse and receiving the predetermined code data from one of the first and the second channel shift register means, in one position, the transfer clock pulse clocking the predetermined code data from one of the first and the second channel shift registers into the buffer storage means, the buffer storage means including a portion receiving the permanent storage comparison signal indicating the predetermined code clocked into the buffer storage means corresponds to one of the permanently stored codes.

30. A communication apparatus, comprising:

an identifier unit having a portion generating and transmitting a transmit signal, and a portion receiving predetermined signals, the identifier unit including:

an oscillator generating an output signal having a predetermined frequency; and a modulator receiving the oscillator output signal and transmitting a predetermined modulation signal, the modulation signal being length amplitude modulated sufficient to produce a predetermined number L pulses and insufficient to produce a predetermined number M pulses, the predetermined number L being less than the predetermined number M and having a pulse interval of a predetermined length;

a vehicle unit receiving the transmit signal when coupled thereto, having a portion emitting an emitted signal coherently related to the transmit signal, the emitted signal being received by the receiving portion of the identifier means when coupled thereto, the vehicle unit including:

a receiver receiving the transmit signal and providing an output signal corresponding to the received transmit signal;

an identification encoder connected to the receiver and receiving the receiver output signal, the identification encoder having a predetermined code and providing an output signal indicative of the predetermined code in response to the receiver output signal; and a signal controller receiving the receiver output signal and the identification encoder output signal and encoding the predetermined code in the received receiver output signal providing an encoded emitted signal having a frequency coherently related to the frequency of the transmit signal and encoded with the predetermined code;

an L-digital counter receiving the modulation signal in response to a predetermined number of input pulses thereto;

an M-digital counter receiving the modulation signal and providing an output pulse signal in response to a predetermined number M input pulses thereto;

means connected to the L-digital counter and the M-digital counter providing an output signal resetting the L-digital counter and the M-digital counter in response to the pulse interval of the modulation signal;

a Q-digital counter receiving the output pulse signal from the L-digital counter and providing an output signal in response to a predetermined number Q input pulses thereto, and receiving the output pulse signal from the M-digital counter and being reset thereby; and means receiving the Q-digital counter output signal and providing an output indication in response thereto; and coupling means coupling the transmit signal to the vehicle unit and coupling the emitted signal to the identifier unit in a communicating proximity position of the vehicle unit and the coupling means.

31. A communication apparatus for providing communication between a first object and a second object, comprising:

means in the first object to generate and transmit a transmit signal;

receiver means in the second object receiving the transmit signal and providing a receiver output signal in response to a received transmit signal having a signal strength level corresponding to the predetermined receiver means threshold;
means in the second object receiving the receiver output signal and providing a predetermined, identifiable output signal responsive thereto; and
means in the first object receiving signals and determining received signals corresponding to the identifiable output signals of the means in the second object in an activated position, said means being activated in response to received signals of a predetermined signal strength level, the receiver means threshold level being determined to be of a sufficient level for the identifiable output signal to activate the means in the first object receiving signals.

32. A method for communicating between a first object and a second object, comprising:
transmitting a transmit signal from the first object;
receiving the transmit signal at the second object;
producing a signal indicative of a predetermined code at a frequency coherently related to the transmit signal frequency in response to the received transmit signal;
modulating the received transmit signal via the signal indicative of the predetermined code producing an emitted signal having a frequency coherently related to transmit signal frequency and encoded with the predetermined code;
transmitting the emitted signal; and
receiving the encoded emitted signal at the first object.

33. A communication apparatus in a second object for receiving a transmit signal from a first object and emitting a signal in response thereto, comprising:
a receiver receiving the transmit signal and providing a receiver output signal in response thereto, the receiver output signal having a frequency coherently related to the frequency of the transmit signal;
an identification encoder connected to the receiver and receiving the receiver output signal, the identification encoder having a predetermined code and providing an output signal indicative of the predetermined code in response to the receiver output signal; and
a signal controller receiving the receiver output signal and the identification encoder output signal and encoding the predetermined code in the received receiver output signal providing an encoded emitted signal having a frequency coherently related to the transmit signal and encoded with the predetermined code.

34. A communication apparatus for providing communication between a first object and a second object, comprising:
means in the first object generating and transmitting a transmit signal;
means in the second object receiving the transmit signal and providing an emitted signal coherently related to the transmit signal in response to the received transmit signal, the means providing the emitted signal including:
means having a predetermined code storage therein providing a cyclic output signal, the output signal being indicative of the predetermined code;
a frequency translator receiving the transmit signal and providing a frequency translated output signal in response thereto; and
a modulator receiving the frequency translator output signal and the output signal indicative of the predetermined code, the signal indicative of the predetermined code modulating the frequency translator output signal repetitively encoding the predetermined code therein to provide a modulator output signal corresponding to the emitted signal repetitively encoded with the predetermined code;
means in the first object receiving the emitted signal including:
means determining the predetermined code of the received encoded emitted signal to be identically repeatable a predetermined number of times and providing a valid data output signal responsive to such determination;
a permanent storage in the first object having a plurality of predetermined permanent codes stored therein;
a storage comparator receiving the predetermined code encoded in the received emitted signal and receiving the permanent codes, the storage comparator comparing the received permanent predetermined codes with the received code encoded in the emitted signal and providing a permanent storage comparison signal in response to a comparison of the received predetermined code with one of the permanent codes.

35. A communication apparatus for communicating between a first object and a second object, comprising:

means in the first object generating and transmitting a transmit signal;
means in the second object receiving the transmit signal and cyclicly encoding the received transmit signal with a predetermined code providing an emitted signal having the predetermined code repetitively encoded therein;
channel shift register means in the first object having a predetermined number of digital shift register stages receiving the emitted signal and receiving the predetermined code encoded in the emitted signal between the first and the last digital shift register stage thereof;
means connected to the channel shift register means providing an input clock pulse clocking the encoded emitted signal into the first digital shift register stage of the channel shift register means when connected thereto;
a gate connected to the channel shift register means receiving the encoded data clocked into the first digital shift register stage and receiving the data clocked from the last digital shift register stage, the gate providing an output indication signal in response to a difference in the received signals; and means receiving the output indication signal of the gate and determining the number of input signal pulses of the encoded data clocked into the first digital shift register stage identical to the input signal pulses clocked from the last digital shift register stage determining the repeatability of the data encoded in the receiving incoming signal.

36. A method for communicating a predetermined code between a first and a second object, comprising:

transmitting a transmit signal from the first object;
receiving the transmit signal in the second object;
encoding cyclicly the received transmit signal with a predetermined code;
transmitting the cyclicly encoded signal;
receiving the transmitted cyclicly encoded signal at the first object via a channel shift register having a predetermined number of digital shift register stages, the predetermined code in the encoded signal being received between the first and the last digital shift register stages of the channel shift register;

clocking the encoded signal into the channel shift register;
comparing the encoded data clocked into the first digital shift register stage with the encoded data clocked from the last digital shift register stage; and providing an output signal in response to a compared difference between the encoded data clocked into the first digital shift register stage and the encoded data clocked from the last digital shift register stage.

* * * * *

UNITED STATES PATENT OFFICE
CERTIFICATE OF CORRECTION

Patent No. 3,839,717                Dated October 1, 1974

Inventor(s) John C. Paul

It is certified that error appears in the above-identified patent and that said Letters Patent are hereby corrected as shown below:

Column 7, line 18, "speced" should be --spaced--.

Column 8, line 56, "or" should be --of--.

Column 26, line 17, before the word "detect" add the word --to--.

Column 31, line 2, "sh8ift" should be --shift--.

Column 31, line 58, "Pth" should be --$P^{th}$--.

Column 33, line 67, "322" should be --332--.

Column 36, line 45, after the figure "300" add the following: --and 302--.

Column 43, line 17, "eace" should be --each--.

Signed and sealed this 28th day of January 1975.

(SEAL)
Attest:

McCOY M. GIBSON JR.                C. MARSHALL DANN
Attesting Officer                  Commissioner of Patents